(12) United States Patent
Fayneh et al.

(10) Patent No.: US 12,461,143 B2
(45) Date of Patent: Nov. 4, 2025

(54) INTEGRATED CIRCUIT MARGIN MEASUREMENT

(71) Applicant: PROTEANTECS LTD., Haifa (IL)

(72) Inventors: Eyal Fayneh, Givatayim (IL); Yahel David, Kibbutz Gazit (IL); Evelyn Landman, Haifa (IL)

(73) Assignee: PROTEANTECS LTD., Haifa (IL)

( * ) Notice: Subject to any disclaimer, the term of this patent is extended or adjusted under 35 U.S.C. 154(b) by 92 days.

(21) Appl. No.: 18/421,199

(22) Filed: Jan. 24, 2024

(65) Prior Publication Data

US 2025/0237695 A1 Jul. 24, 2025

(51) Int. Cl.
*G01R 31/28* (2006.01)

(52) U.S. Cl.
CPC ..... *G01R 31/2856* (2013.01); *G01R 31/2882* (2013.01)

(58) Field of Classification Search
CPC  G01R 31/26; G01R 31/2642; G01R 31/2648; G01R 31/2831; G01R 31/31702
See application file for complete search history.

(56) References Cited

U.S. PATENT DOCUMENTS

| | | | |
|---|---|---|---|
| 4,555,663 A | 11/1985 | Shimizu | |
| 5,548,539 A | 8/1996 | Vlach et al. | |
| 5,748,509 A | 5/1998 | Fewster | |
| 5,774,403 A | 6/1998 | Airell, II et al. | |
| 5,818,251 A | 10/1998 | Intrater | |
| 5,895,629 A | 4/1999 | Russell et al. | |
| 5,956,497 A | 9/1999 | Ratzel et al. | |
| 5,966,527 A | 10/1999 | Krivokapic et al. | |
| 6,172,546 B1 | 1/2001 | Liu et al. | |
| 6,182,253 B1 | 1/2001 | Lawrence et al. | |
| 6,486,716 B1 | 11/2002 | Minami et al. | |

(Continued)

FOREIGN PATENT DOCUMENTS

| | | |
|---|---|---|
| CN | 1886668 A | 12/2006 |
| CN | 101014991 A | 8/2007 |

(Continued)

OTHER PUBLICATIONS

Mridul Agarwal et al, "Circuit Failure Prediction and Its Application to Transistor Aging"; 5th IEEE VLSI Test Symposium (VTS'07), pp. 277-286, May 6-10, 2007. doi: 10.1109/VTS.2007.22.

(Continued)

*Primary Examiner* — Tung X Nguyen
(74) *Attorney, Agent, or Firm* — The Roy Gross Law Firm, LLC; Roy D. Gross

(57) ABSTRACT

Failure risk measurement in a semiconductor Integrated Circuit (IC) by generating a pulse of a preset time duration on an output path when a signal from a data path and/or control logic circuit of the semiconductor IC changes. The data paths and/or control logic circuits of the semiconductor IC have a common clock. The output paths may be combined to provide a combined output path and a signal on the combined output path may be delayed by a configurable time duration, providing a delayed combined output path signal thereby. The delayed combined output path signal may be received at a data input of a device state element, which is clocked by a signal based on the common clock and outputs a failure risk measurement signal.

20 Claims, 4 Drawing Sheets

(56) References Cited

U.S. PATENT DOCUMENTS

| | | |
|---|---|---|
| 6,555,872 B1 | 4/2003 | Dennen |
| 6,586,921 B1 | 7/2003 | Sunter |
| 6,683,484 B1 | 1/2004 | Kueng et al. |
| 6,807,503 B2 | 10/2004 | Ye et al. |
| 6,873,926 B1 | 3/2005 | Diab |
| 6,882,172 B1 | 4/2005 | Suzuki et al. |
| 6,948,388 B1 | 9/2005 | Clayton et al. |
| 7,038,483 B1 | 5/2006 | Suzuki et al. |
| 7,067,335 B2 | 6/2006 | Weiner et al. |
| 7,069,458 B1 | 6/2006 | Sardi et al. |
| 7,254,507 B2 | 8/2007 | Dosho et al. |
| 7,288,958 B2 | 10/2007 | Takagi |
| 7,369,893 B2 | 5/2008 | Gunderson |
| 7,443,189 B2 | 10/2008 | Ramappa |
| 7,455,450 B2 | 11/2008 | Liu et al. |
| 7,501,832 B2 | 3/2009 | Spuhler et al. |
| 7,612,603 B1 | 11/2009 | Petricek et al. |
| 7,649,373 B2 | 1/2010 | Tokunaga |
| 7,701,246 B1 | 4/2010 | Plants et al. |
| 7,818,601 B2 | 10/2010 | LaBerge |
| 7,877,657 B1 | 1/2011 | Miller et al. |
| 7,940,862 B2 | 5/2011 | Tanaka et al. |
| 8,001,512 B1 | 8/2011 | White |
| 8,086,978 B2 | 12/2011 | Zhang et al. |
| 8,170,067 B2 | 5/2012 | Zerbe et al. |
| 8,279,976 B2 | 10/2012 | Lin et al. |
| 8,310,265 B2 | 11/2012 | Zjajo et al. |
| 8,365,115 B2 | 1/2013 | Liu et al. |
| 8,418,103 B2 | 4/2013 | Wang et al. |
| 8,479,130 B1 | 7/2013 | Zhang et al. |
| 8,633,722 B2 | 1/2014 | Lai |
| 8,825,158 B2 | 9/2014 | Swerdlow |
| 8,996,937 B2 | 3/2015 | Jain et al. |
| 9,275,706 B2 | 3/2016 | Tam |
| 9,424,952 B1 | 8/2016 | Seok et al. |
| 9,483,098 B2 | 11/2016 | Bridges et al. |
| 9,490,787 B1 | 11/2016 | Kho et al. |
| 9,536,038 B1 | 1/2017 | Quinton et al. |
| 9,564,883 B1 | 2/2017 | Quinton et al. |
| 9,564,884 B1 | 2/2017 | Quinton et al. |
| 9,568,546 B2 | 2/2017 | Franzon |
| 9,632,126 B2 | 4/2017 | Yoon et al. |
| 9,714,966 B2 | 7/2017 | Chen et al. |
| 9,760,672 B1 | 9/2017 | Taneja et al. |
| 9,791,834 B2 | 10/2017 | Nassar et al. |
| 9,954,455 B2 | 4/2018 | Lin et al. |
| 9,977,078 B2 | 5/2018 | Loke et al. |
| 9,991,879 B2 | 6/2018 | Huang |
| 10,452,793 B2 | 10/2019 | Joshi et al. |
| 10,490,547 B1 | 11/2019 | Ali et al. |
| 10,509,104 B1 | 12/2019 | Dato |
| 10,530,347 B2 | 1/2020 | Tang et al. |
| 11,036,266 B2 | 6/2021 | Srivastava et al. |
| 11,081,193 B1 | 8/2021 | Tang |
| 11,409,323 B2 | 8/2022 | Herberholz et al. |
| 11,929,772 B2 | 3/2024 | Seol et al. |
| 12,013,800 B1 | 6/2024 | Fayneh et al. |
| 2001/0013111 A1 | 8/2001 | Bishop et al. |
| 2002/0036328 A1 | 3/2002 | Richards, Jr. et al. |
| 2004/0009616 A1 | 1/2004 | Huisman et al. |
| 2004/0015793 A1 | 1/2004 | Saxena et al. |
| 2004/0017234 A1 | 1/2004 | Tam et al. |
| 2004/0230385 A1 | 11/2004 | Bechhoefer et al. |
| 2004/0230396 A1 | 11/2004 | Ye et al. |
| 2004/0267479 A1 | 12/2004 | Querbach et al. |
| 2005/0053162 A1 | 3/2005 | Goishi |
| 2005/0104175 A1 | 5/2005 | Itano et al. |
| 2005/0114056 A1 | 5/2005 | Patel et al. |
| 2005/0134350 A1 | 6/2005 | Huang et al. |
| 2005/0134394 A1 | 6/2005 | Liu |
| 2005/0154552 A1 | 7/2005 | Stroud et al. |
| 2005/0193302 A1 | 9/2005 | Arguelles et al. |
| 2005/0285646 A1 | 12/2005 | Rashid |
| 2006/0049886 A1 | 3/2006 | Agostinelli, Jr. et al. |
| 2006/0184815 A1 | 8/2006 | Ha et al. |
| 2006/0224374 A1 | 10/2006 | Kwon et al. |
| 2007/0022397 A1 | 1/2007 | Darsow et al. |
| 2007/0110199 A1 | 5/2007 | Momtaz et al. |
| 2007/0182456 A1 | 8/2007 | Agarwal et al. |
| 2007/0288183 A1 | 12/2007 | Bulkes et al. |
| 2008/0071489 A1 | 3/2008 | Wissel |
| 2008/0074521 A1 | 3/2008 | Olsen |
| 2008/0144243 A1 | 6/2008 | Mariani et al. |
| 2008/0147355 A1 | 6/2008 | Fields et al. |
| 2008/0183409 A1 | 7/2008 | Roberts et al. |
| 2008/0186001 A1 | 8/2008 | Singh et al. |
| 2008/0186044 A1 | 8/2008 | Singh |
| 2008/0216033 A1 | 9/2008 | Bucossi et al. |
| 2008/0231310 A1 | 9/2008 | Vijayaraghavan |
| 2008/0262769 A1 | 10/2008 | Kadosh et al. |
| 2009/0006914 A1* | 1/2009 | Ko ................. G11C 29/38 714/719 |
| 2009/0027077 A1 | 1/2009 | Vijayaraghavan et al. |
| 2009/0044160 A1 | 2/2009 | Bueti et al. |
| 2009/0076753 A1 | 3/2009 | Vijayaraghavan et al. |
| 2009/0096495 A1 | 4/2009 | Keigo |
| 2009/0105978 A1 | 4/2009 | Schuttert et al. |
| 2009/0183043 A1 | 7/2009 | Niwa |
| 2009/0222775 A1 | 9/2009 | Idgunji et al. |
| 2009/0230947 A1 | 9/2009 | Sumita |
| 2009/0244998 A1 | 10/2009 | Kim |
| 2009/0273550 A1 | 11/2009 | Vieri et al. |
| 2009/0278576 A1 | 11/2009 | Chakravarty |
| 2009/0306953 A1 | 12/2009 | Liu et al. |
| 2010/0122104 A1 | 5/2010 | Defazio et al. |
| 2010/0153896 A1 | 6/2010 | Sewall et al. |
| 2010/0251046 A1 | 9/2010 | Mizuno et al. |
| 2010/0253382 A1 | 10/2010 | Wang et al. |
| 2010/0262942 A1* | 10/2010 | Nakamura ..... G01R 31/318525 716/52 |
| 2011/0093830 A1 | 4/2011 | Chen et al. |
| 2011/0102091 A1 | 5/2011 | Yeric |
| 2011/0109377 A1 | 5/2011 | Fujibe et al. |
| 2011/0113298 A1 | 5/2011 | Van Den Eijnden |
| 2011/0169537 A1 | 7/2011 | Ma |
| 2011/0175658 A1 | 7/2011 | Nomura |
| 2011/0187433 A1 | 8/2011 | Baumann et al. |
| 2011/0267096 A1 | 11/2011 | Chlipala et al. |
| 2011/0295403 A1 | 12/2011 | Higuchi et al. |
| 2011/0315986 A1 | 12/2011 | Kaneda et al. |
| 2012/0025846 A1 | 2/2012 | Minas et al. |
| 2012/0038388 A1 | 2/2012 | Tseng et al. |
| 2012/0051395 A1 | 3/2012 | Chen et al. |
| 2012/0063524 A1 | 3/2012 | Stott |
| 2012/0074973 A1 | 3/2012 | Baldwin et al. |
| 2012/0163074 A1 | 6/2012 | Franca-Neto et al. |
| 2012/0170616 A1 | 7/2012 | Tsai et al. |
| 2012/0187991 A1 | 7/2012 | Sathe et al. |
| 2012/0212246 A1 | 8/2012 | Benjamin et al. |
| 2012/0217976 A1 | 8/2012 | Clarkson |
| 2012/0221906 A1 | 8/2012 | Shetty et al. |
| 2012/0242490 A1 | 9/2012 | Ramaswami |
| 2013/0088256 A1 | 4/2013 | Chlipala et al. |
| 2013/0226491 A1 | 8/2013 | Emilio et al. |
| 2013/0241690 A1 | 9/2013 | Wallace et al. |
| 2013/0293270 A1 | 11/2013 | Lee et al. |
| 2013/0335875 A1 | 12/2013 | Baumann |
| 2014/0132293 A1 | 5/2014 | Abadir et al. |
| 2014/0132315 A1 | 5/2014 | Sharma et al. |
| 2014/0143586 A1 | 5/2014 | Dalumi et al. |
| 2014/0184243 A1 | 7/2014 | Iyer et al. |
| 2014/0254734 A1 | 9/2014 | Abdelmoneum et al. |
| 2015/0061707 A1 | 3/2015 | Balasubramanian et al. |
| 2015/0061721 A1 | 3/2015 | Jeong |
| 2015/0077136 A1 | 3/2015 | Li |
| 2015/0100815 A1 | 4/2015 | Xanthopoulos et al. |
| 2015/0121158 A1 | 4/2015 | Wang et al. |
| 2015/0199223 A1 | 7/2015 | Banerjee et al. |
| 2015/0332451 A1 | 11/2015 | Amzaleg et al. |
| 2015/0355033 A1 | 12/2015 | Zhang et al. |
| 2015/0365049 A1 | 12/2015 | Ozawa et al. |
| 2016/0033574 A1 | 2/2016 | Serrer et al. |
| 2016/0042784 A1 | 2/2016 | Rim et al. |
| 2016/0072511 A1 | 3/2016 | Maekawa |

(56) References Cited

U.S. PATENT DOCUMENTS

| | | |
|---|---|---|
| 2016/0087643 A1 | 3/2016 | Nozaki |
| 2016/0125434 A1 | 5/2016 | Kohn et al. |
| 2016/0131708 A1 | 5/2016 | Huang et al. |
| 2016/0153840 A1 | 6/2016 | Huang et al. |
| 2016/0156176 A1 | 6/2016 | Kunz, Jr. et al. |
| 2016/0164503 A1 | 6/2016 | Kim et al. |
| 2016/0203036 A1 | 7/2016 | Mezic et al. |
| 2016/0254804 A1 | 9/2016 | Meng |
| 2016/0373098 A1 | 12/2016 | Prasad et al. |
| 2017/0038265 A1 | 2/2017 | Abdelmoneum et al. |
| 2017/0093399 A1 | 3/2017 | Atkinson et al. |
| 2017/0160339 A1 | 6/2017 | Jenkins |
| 2017/0179173 A1 | 6/2017 | Mandai et al. |
| 2017/0199089 A1 | 7/2017 | Fritchman et al. |
| 2017/0199228 A1 | 7/2017 | Hsieh et al. |
| 2017/0214516 A1 | 7/2017 | Rivaud et al. |
| 2017/0329391 A1 | 11/2017 | Jaffari et al. |
| 2017/0344102 A1 | 11/2017 | Kolla et al. |
| 2017/0345490 A1 | 11/2017 | Yoshimoto et al. |
| 2017/0364818 A1 | 12/2017 | Wu et al. |
| 2018/0034549 A1 | 2/2018 | Kikuchi |
| 2018/0109245 A1 | 4/2018 | Takagi |
| 2018/0183413 A1 | 6/2018 | Wong et al. |
| 2018/0365974 A1 | 12/2018 | Haas et al. |
| 2019/0019096 A1 | 1/2019 | Yoshida et al. |
| 2019/0117122 A1 | 4/2019 | Kurachi et al. |
| 2019/0128961 A1 | 5/2019 | Heron et al. |
| 2019/0162783 A1 | 5/2019 | Huang |
| 2019/0187204 A1 | 6/2019 | Doescher et al. |
| 2019/0196564 A1 | 6/2019 | Murtagh et al. |
| 2019/0265767 A1 | 8/2019 | Mehra et al. |
| 2019/0302830 A1 | 10/2019 | Chen et al. |
| 2019/0305074 A1 | 10/2019 | Kande et al. |
| 2020/0028514 A1 | 1/2020 | Hanke et al. |
| 2020/0203333 A1 | 6/2020 | Chen et al. |
| 2020/0209070 A1 | 7/2020 | Tang et al. |
| 2020/0309850 A1 | 10/2020 | Bismuth |
| 2020/0313664 A1 | 10/2020 | Azam et al. |
| 2021/0181251 A1 | 6/2021 | Hsieh et al. |
| 2021/0325455 A1 | 10/2021 | Fayneh et al. |
| 2021/0341535 A1 | 11/2021 | Hsieh et al. |
| 2022/0260630 A1 | 8/2022 | Fayneh et al. |
| 2022/0349935 A1 | 11/2022 | Fayneh et al. |
| 2022/0349938 A1 | 11/2022 | Vezyrtzis et al. |
| 2023/0098071 A1 | 3/2023 | Chonnad et al. |

FOREIGN PATENT DOCUMENTS

| | | |
|---|---|---|
| CN | 101241429 A | 8/2008 |
| CN | 101344898 A | 1/2009 |
| CN | 101915625 B | 7/2012 |
| CN | 102273077 B | 9/2014 |
| CN | 102422169 A | 11/2014 |
| CN | 105210188 A | 12/2015 |
| CN | 106959400 A | 7/2017 |
| CN | 108534866 A | 9/2018 |
| CN | 113466670 A | 10/2021 |
| DE | 102007002253 A1 | 7/2007 |
| DE | 102014216786 B3 | 10/2015 |
| DE | 102012219971 A1 | 7/2016 |
| EP | 962991 A1 | 12/1999 |
| EP | 1262755 A1 | 12/2002 |
| EP | 2006784 A1 | 12/2008 |
| EP | 2060924 A1 | 5/2009 |
| EP | 2413150 A1 | 2/2012 |
| EP | 2770313 A1 | 8/2014 |
| JP | S57116228 A | 7/1982 |
| JP | 2000215693 A | 8/2000 |
| JP | 2002243800 A | 8/2002 |
| JP | 2008147245 A | 6/2008 |
| JP | 2009065533 A | 3/2009 |
| JP | 2009074921 A | 4/2009 |
| JP | 2011204328 A | 10/2011 |
| JP | 2012037238 A | 2/2012 |
| JP | 2012088322 A | 5/2012 |
| JP | 2009021348 A | 7/2013 |
| JP | 2014085348 A | 5/2014 |
| JP | 2016111563 A | 6/2016 |
| KR | 101232207 B1 | 2/2013 |
| KR | 2013110989 A | 10/2013 |
| KR | 20150073199 A | 6/2015 |
| TW | 200914841 A | 4/2009 |
| TW | 201614256 A | 3/2016 |
| TW | 201709669 A | 3/2017 |
| WO | 2005080099 A1 | 9/2005 |
| WO | 2013070218 A1 | 5/2013 |
| WO | 2013027739 A1 | 3/2015 |
| WO | 2019097516 A1 | 5/2019 |
| WO | 2019102467 A1 | 5/2019 |
| WO | 2019135247 A1 | 7/2019 |
| WO | 2019202595 A1 | 10/2019 |
| WO | 2019244154 A1 | 12/2019 |
| WO | 2020141516 A1 | 7/2020 |
| WO | 2020230130 A1 | 11/2020 |
| WO | 2021019539 A1 | 2/2021 |
| WO | 2021111444 A1 | 6/2021 |
| WO | 2021214562 A1 | 10/2021 |
| WO | 2022/009199 A1 | 1/2022 |
| WO | 2022215076 A1 | 10/2022 |
| WO | 2023084528 A1 | 5/2023 |
| WO | 2023084529 A1 | 5/2023 |
| WO | 2023238128 A1 | 12/2023 |
| WO | 2024/166103 A1 | 8/2024 |
| WO | 2025146691 A1 | 7/2025 |

OTHER PUBLICATIONS

Keith A. Bowman et al, "Energy-Efficient and Metastability—Immune Resilient Circuits for Dynamic Variation Tolerance"; IEEE Journal of Solid-State Circuits vol. 44, Issue 1, pp. 49-63, Jan. 2009. doi: 10.1109/JSSC.2008.2007148.

Shidhartha Das et al, "A Self-Tuning DVS Processor Using Delay-Error Detection and Correction"; IEEE Journal of Solid-State Circuits; vol. 41, Issue 4, pp. 792-804, Apr. 2006. doi: 10.1109/JSSC.2006.870912.

Shidhartha Das et al, "RazorII: In Situ Error Detection and Correction for PVT and SER Tolerance" 2008 IEEE International Solid-State Circuits Conference—Digest of Technical Papers, Feb. 3-7, 2008. doi: 10.1109/JSSC.2008.2007145.

Ramyanshu Datta et al, "On-Chip Delay Measurement for Silicon Debug"; GLSVLSI '04: Proceedings of the 14th ACM Great Lakes symposium on VLSI; pp. 145-148, Apr. 26-28, 2004. https://doi.org/10.1145/988952.988988.

Alan Drake et al, "A Distributed Critical-Path Timing Monitor for a 65nm High-Performance Microprocessor"; 2007 IEEE International Solid-State Circuits Conference. Digest of Technical Papers; Feb. 11-15, 2007. doi: 10.1109/ISSCC.2007.373462.

Matthias Eireiner et al, "In-Situ Delay Characterization and Local Supply Voltage Adjustment for Compensation of Local Parametric Variations"; IEEE Journal of Solid-State Circuits; vol. 42, Issue 7, pp. 1583-1592, Jul. 2007. doi: 10.1109/JSSC.2007.896695.

Matthew Fojtik et al, "Bubble Razor: An architecture-independent approach to timing-error detection and correction"; 2012 IEEE International Solid-State Circuits Conference; Feb. 19-23, 2012. doi: 10.1109/ISSCC.2012.6177103.

Matthew Fojtik et al, "Bubble Razor: Eliminating Timing Margins in an ARM Cortex-M3 Processor in 45 nm CMOS Using Architecturally Independent Error Detection and Correction"; IEEE Journal of Solid-State Circuits; vol. 48, Issue 1, pp. 66-81, Jan. 2013. doi: 10.1109/JSSC.2012.2220912.

Piero Franco et al, "On-Line Delay Testing of Digital Circuits"; Proceedings of IEEE VLSI Test Symposium; Apr. 25-28, 1994, pp. 167-173, doi: 10.1109/VTEST.1994.292318.

V. Huard et al, "Adaptive Wearout Management with in-situ aging monitors"; 2014 IEEE International Reliability Physics Symposium; Jun. 1-5, 2014. pp. 6B.4.1-6B.4.11, doi: 10.1109/IRPS.2014.6861106.

Liangzhen Lai et al, "SlackProbe: A Flexible and Efficient In Situ Timing Slack Monitoring Methodology"; IEEE Transactions on

(56) References Cited

OTHER PUBLICATIONS

Computer-Aided Design of Integrated Circuits and Systems; vol. 33, Issue 8, pp. 1168-1179, Aug. 2014. doi: 10.1109/TCAD.2014.2323195.

M. Saliva et al, "Digital Circuits Reliability with In-Situ Monitors in 28nm Fully Depleted SOI"; 2015 Design, Automation Mar. 9-13, 2015. doi: 10.7873/DATE.2015.0238.

Martin Wirnshofer et al, "A Variation-Aware Adaptive Voltage Scaling Technique based on In-Situ Delay Monitoring"; 14th IEEE International Symposium on Design and Diagnostics of Electronic Circuits and Systems; pp. 261-266, Apr. 13-15, 2011. doi: 10.1109/DDECS.2011.5783090.

Martin Wirnshofer et al, "An Energy-Efficient Supply Voltage Scheme using In-Situ Pre-Error Detection for on-the-fly Voltage Adaptation to PVT Variations"; 2011 International Symposium on Integrated Circuits; pp. 94-97, Dec. 12-14, 2011. doi: 10.1109/ISICir.2011.6131888.

Martin Wirnshofer et al, "On-line supply voltage scaling based on in situ delay monitoring to adapt for PVTA variations"; Journal of Circuits, Systems and Computers; vol. 21, No. 08, Mar. 7, 2012. doi: 10.1142/S0218126612400270.

S. Mhira et al, "Dynamic Adaptive Voltage Scaling in Automotive environment"; 2017 IEEE International Reliability Physics Symposium (IRPS); pp. 3A-4.1-3A-4.7, Apr. 2-6, 2017. doi: 10.1109/IRPS.2017.7936279.

A. Benhassain et al, "Early failure prediction by using in-situ monitors: Implementation and application results"; Online at: https://ceur-ws.org/Vol-1566/Paper6.pdf, Mar. 18, 2016.

Charles R. Lefurgy et al, "Active Management of Timing Guardband to Save Energy in Power7"; 2011 44th Annual IEEE/ACM International Symposium on Microarchitecture (MICRO); pp. 1-11; Dec. 3-7, 2011.

C. R. Lefurgy et al., "Active Guardband Management in Power7+ to Save Energy and Maintain Reliability"; in IEEE Micro, vol. 33, No. 4, pp. 35-45, Jul.-Aug. 2013. doi: 10.1109/MM.2013.52.

B. Zandian et al, "Cross-layer resilience using wearout aware design flow"; 2011 IEEE/IFIP 41st International Conference on Dependable Systems & Networks (DSN), pp. 279-290, Jun. 27-30, 2011. doi: 10.1109/DSN.2011.5958226.

M. Cho et al., "Postsilicon Voltage Guard-Band Reduction in a 22 nm Graphics Execution Core Using Adaptive Voltage Scaling and Dynamic Power Gating"; in IEEE Journal of Solid-State Circuits, vol. 52, No. 1, pp. 50-63, Jan. 4, 2017. doi: 10.1109/JSSC.2016.2601319.

W. Shan et al, "Timing error prediction based adaptive voltage scaling for dynamic variation tolerance"; 2014 IEEE Asia Pacific Conference on Circuits and Systems (APCCAS), pp. 739-742, Nov. 17-20, 2014. doi: 10.1109/APCCAS.2014.7032887.

J. Li et al, "Robust and in-situ self-testing technique for monitoring device aging effects in pipeline circuits"; 2014 51st ACM/EDAC/IEEE Design Automation Conference (DAC), pp. 1-6, Jun. 1-5, 2014.

X. Shang et al, "A 0.44V-1.1V 9-transistor transition-detector and half-path error detection technique for low power applications"; 2017 IEEE Asian Solid-State Circuits Conference (A-SSCC), pp. 205-208, Nov. 6-8, 2017. doi: 10.1109/ASSCC.2017.8240252.

Liangzhen Lai et al, "Accurate and inexpensive performance monitoring for variability-aware systems"; 2014 19th Asia and South Pacific Design Automation Conference (ASP-DAC), pp. 467-473, Jan. 20-23, 2014. doi: 10.1109/ASPDAC.2014.6742935.

Martin Wirnshofer et al, "Adaptive voltage scaling by in-situ delay monitoring for an image processing circuit"; 2012 IEEE 15th International Symposium on Design and Diagnostics of Electronic Circuits & Systems (DDECS), pp. 205-208, Apr. 18-20, 2012. doi: 10.1109/DDECS.2012.6219058.

Youhua Shi et al, "Suspicious timing error prediction with in-cycle clock gating"; International Symposium on Quality Electronic Design (ISQED), pp. 335-340, Mar. 4-6, 2013. doi: 10.1109/ISQED.2013.6523631.

Youhua Shi et al, "In-situ timing monitoring methods for variation-resilient designs"; 2014 IEEE Asia Pacific Conference on Circuits and Systems (APCCAS), pp. 735-738, Nov. 17-20, 2014. doi: 10.1109/APCCAS.2014.7032886.

Jongho Kim et al., "Adaptive delay monitoring for wide voltage-range operation"; 2016 Design, Automation & Test in Europe Conference & Exhibition (DATE), pp. 511-516, Mar. 14-18, 2016. DOI: 10.3850/9783981537079_0330.

Xiaobin Yuan et al., "Design Considerations for Reconfigurable Delay Circuit to Emulate System Critical Paths"; in IEEE Transactions on Very Large Scale Integration (VLSI) Systems, vol. 23, No. 11, pp. 2714-2718, Nov. 2015. doi: 10.1109/TVLSI.2014.2364785.

Kan Takeuchi et al; "FEOL/BEOL wear-out estimator using stress-to-frequency conversion of voltage/temperature-sensitive ring oscillators for 28nm automotive MCUs"; IEEE, pp. 265-268, Oct. 20, 2016. doi: 10.1109/ESSCIRC.2016.7598293.

Kan Takeuchi et al; "Wear-out stress monitor utilising temperature and voltage sensitive ring oscillators" IET Circuits, Devices & Systems. vol. 12 No. 2, pp. 182-188, Jan. 15, 2018. doi: 10.1049/iet-cds.2017.0153.

Kan Takeuchi et al; "Experimental Implementation of 8.9Kgate Stress Monitor in 28nm MCU along with Safety Software Library for IoT Device Maintenance"; IEEE International Reliability Physics Symposium (IRPS). Mar. 31, 2019. doi: 10.1109/IRPS.2019.8720583.

Dan Ernst et al; "Razor: circuit-level correction of timing errors for low-power operation," in IEEE Micro, vol. 24, No. 6, pp. 10-20, Nov.-Dec. 2004, doi: 10.1109/MM.2004.85.

Dan Ernst et al; "Razor: A Low-Power Pipeline Based on Circuit-Level Timing Speculation"; Appears in the 36th Annual International Symposium on Microarchitecture (Micro-36). Dec. 1, 2003. doi: 10.1109/MICRO.2003.1253179.

James P. Hofmeister, et al, "Ball Grid Array (BGA) Solder Joint Intermittency Detection: SJ BIST™", IEEE Aerospace Conference Proceedings, Apr. 2008, paper #1148, Version 1. doi: 10.1109/AERO.2008.4526624.

Paulheim H, Meusel R. "A decomposition of the outlier detection problem into a set of supervised learning problems", Machine Learning, Sep. 2015, vol. 100 Issue 2, pp. 509-531. DOI 10.1007/s10994-015-5507-y.

Zhang L, Marron JS, Shen H, Zhu Z., "Singular value decomposition and its visualization", Journal of Computational and Graphical Statistics, Dec. 2007, vol. 6 Issue 4, pp. 833-854. DOI: 10.1198/106186007X256080.

Shinkai, Ken-ichi et al. "Device-parameter estimation with on-chip variation sensors considering random variability."; In 16th Asia and South Pacific Design Automation Conference (ASP-DAC 2011), pp. 683-688. IEEE, Jan. 25, 2011. doi: 10.1109/ASPDAC.2011.5722274.

Weiwei Shan et al. "An improved timing error prediction monitor for wide adaptive frequency scaling"; IEICE Electronics Express, vol. 14, No. 21, pp. 1-6, Oct. 20, 2017. DOI: 10.1587/elex.14.20170808.

Agilent Technologies; "Clock Jitter Analysis with femto-second resolution"; Jan. 1, 2008.

Yousuke Miyake et al; "Temperature and voltage estimation using ring-oscillator-based monitor for field test"; IEEE 23rd Asian Test Symposium; pp. 156-161, Nov. 16, 2014. doi: 10.1109/ATS.2014.38.

Basab Datta at al.; "Analysis of A Ring Oscillator Based on Chip Thermal Sensor in 65nm Technology"; Online at: https://web.archive.org/web/20140328234617/http://www-unix.ecs.umass.edu/~dkumar/lab4_658_report/lab4_report.htm; Sep. 5, 2018.

Tilman Wolf et al; "Collaborative Monitors for Embedded System Security". Jan. 1, 2006. First Workshop on Embedded System Security in conjunction with EMSOFT '06, Oct. 26, 2006, Seoul, South Korea.

Sandeep Kumar Samal et al; "Machine Learning Based Variation Modeling and Optimization for 3D ICs"; J. Inf. Commun. Converg. Eng. 14(4): 258-267, Dec. 2016. DOI: 10.6109/jicce.2016.14.4.258.

Yin-Nien Chen et al; "Impacts of Work Function Variation and Line-Edge Roughness on TFET and FinFET Devices and 32-Bit

(56) References Cited

OTHER PUBLICATIONS

CLA Circuits"; J. Low Power Electron. Appl. 2015, 5, 101-115. May 21, 2015. doi:10.3390/jlpea5020101.

Yong Zhao et al; "A Genetic Algorithm Based Remaining Lifetime Prediction for a VLIW Processor Employing Path Delay and IDDX Testing"; IEEE; Apr. 12, 2016. 2016 11th International Conference on Design and Technology of Integrated Systems in Nanoscale Era (DTIS), Istanbul, Turkey, 2016, pp. 1-4, doi: 10.1109/DTIS.2016.7483805.

Vivek S Nandakumar et al, "Statistical static timing analysis flow for transistor level macros in a microprocessor"; 2010, 11th International Symposium on Quality Electronic Design (ISQED), pp. 163-170, Mar. 22, 2010. doi: 10.1109/ISQED.2010.5450412.

Jing Li et al, "Variation Estimation and Compensation Technique in Scaled LTPS TFT Circuits for Low-Power Low-Cost Applications"; IEEE Transactions on Computer-Aided Design of Integrated Circuits and Systems, vol. 28(1): 46-59, Jan. 1, 2009. doi: 10.1109/TCAD.2008.2009149.

Xie Qing et al "Variation-Aware Joint Optimization of the Supply Voltage and Sleep Transistor Size for 7nm FinFET Technology"; 2014 IEEE 32nd international conference on computer design, pp. 380-385, Oct. 19, 2014. doi: 10.1109/ICCD.2014.6974709.

Rebaud B et al , "Timing slack monitoring under process and environmental variations: Application to a DSP performance optimization"; Microelectronics Journal vol. 42 Issue 5, pp. 718-732, Feb. 8, 2011. doi: 10.1016/j.mejo.2011.02.005.

Dierickx B et al, "Propagating variability from technology to system Level"; Physics of Semiconductor Devices, pp. 74-79, Dec. 16, 2007. doi: 10.1109/IWPSD.2007.4472457.

Zheng K., "A Comparison of Digital Droop Detection Techniques in ASAP7 FinFET"; Research Review. Sep. 2019.

Hongge Chen, "Novel Machine Learning Approaches for Modeling Variations in Semiconductor Manufacturing," Master thesis, Jun. 2017.

Nidhal Selmane, Shivam Bhasin, Sylvain Guilley, Tarik Graba, Jean-Luc Danger. "WDDL is Protected Against Setup Time Violation Attacks." CHES, Sep. 2009, Lausanne, Switzerland. pp. 73-83. doi: 10.1109/FDTC.2009.40.

Nidhal Selmane, Shivam Bhasin, Sylvain Guilley, Jean-Luc Danger. "Security evaluation of application-specific integrated circuits and field programmable gate arrays against setup time violation attacks." IET Inf. Secur., 2011, vol. 5, Iss. 4, pp. 181-190. doi: 10.1049/iet-ifs.2010.0238.

Jianfeng Zhang et al, "Parameter Variation Sensing and Estimation in Nanoscale Fabrics"; Journal of Parallel and Distributed Computing; vol. 74, Issue 6, pp. 2504-2511, Jun. 1, 2014. https://doi.org/10.1016/j.jpdc.2013.08.005.

I. A. K. M. Mahfuzul et al, "Variation-sensitive monitor circuits for estimation of Die-to-Die process variation"; 2011 IEEE ICMTS International Conference on Microelectronic Test Structures; pp. 153-157, Apr. 4-7, 2011. doi: 10.1109/ICMTS.2011.5976878.

Ying Qiao et al, "Variability-aware compact modeling and statistical circuit validation on SRAM test array"; Proceedings vol. 9781, Design-Process-Technology Co-optimization for Manufacturability X, Mar. 16, 2016. https://doi.org/10.1117/12.2219428.

David Herres, "The Eye Diagram: What is it and why is it used?"; Online at: https://www.testandmeasurementtips.com/basics-eye-diagrams/, Aug. 16, 2016.

Yu-Chuan Lin et al, "A 10-GB/s Eye-Opening Monitor Circuit for Receiver Equalizer Adaptations in 65-nm CMOS;" in IEEE Transactions on Very Large Scale Integration (VLSI) Systems, vol. 28, No. 1, pp. 23-34, doi: 10.1109/TVLSI.2019.2935305.

Borivoje Nikolic et al., "Technology Variability From A design Perspective"; IEEE Transactions on Circuits and Systems I: Regular Papers; vol. 58, Issue: 9, pp. 1996-2009, Sep. 8, 2011. doi: 10.1109/TCSI.2011.2165389.

Tamas Virosztek, "Maximum likelihood estimation of ADC parameters"; [Master of Science Thesis, Budapest University of Technology and Economics], pp. 1-67, Dec. 19, 2013. Available online: [https://dsp.mit.bme.hu/userfiles/publikaciok/virosztekdiploma13.pdf].

\* cited by examiner

INTEGRATED CIRCUIT MARGIN MEASUREMENT

FIELD OF THE INVENTION

The invention relates to the field of semiconductor integrated circuits.

BACKGROUND

Integrated circuits (ICs) may include analog and digital electronic circuits on a flat semiconductor substrate, such as a silicon wafer. Microscopic transistors are printed onto the substrate using photolithography techniques to produce complex circuits of billions of transistors in a very small area, making modern electronic circuit design using ICs both low cost and high performance. ICs are produced in assembly lines of factories, termed foundries, that have commoditized the production of ICs, such as complementary metal-oxide-semiconductor (CMOS) ICs. Digital ICs contain billions of transistors arranged in functional and/or logical units on the wafer, with data-paths interconnecting the functional units that transfer data values between the functional units. As used herein, the term "data-path" means a parallel series of electronic connections, or paths, for transferring data signals between functional/logical units of an IC, and each data-path may include a specific number of bit paths, such as 64, 128, 256, ort the like. During the IC design process, the timing of the functional units is arranged so that each functional unit may usually complete the required processing of that unit within a single clock cycle. A safety factor may be used to account for manufacturing differences of individual ICs and possible changes, such as degradations, over the planned lifetime of the IC.

The degrading of an IC's transistors over time is termed aging. For example, the degradation of transistors over time leads slowly to decreased switching speeds, and may even result in outright circuit failures, when they exceed the design safety factors. Usually, the design process incorporates these delays into the design such that the ICs will not fail during their normal lifetime, but environmental and usage conditions (such as heat, voltage, current, humidity, and/or the like) may accelerate the aging process.

IC transistors, such as bipolar transistors, metal-oxide semiconductor field-effect transistors (MOSFETs), and/or the like, may be used in digital ICs and may function as electrical switches. For example, a MOSFET may have four terminals, such as the body, the gate, the source, and the drain, yet typically the source and body are electrically connected. The voltage applied to the gate may determine the amount of current that flows between the source and drain. A thin layer of dielectric material electrically insulates the gate, and the electric field applied across the gate may alter the conductivity of the underlying semiconductor channel between the source and drain.

With use, charge carriers (such as electrons for negative, or n-channel, MOSFETs, or holes for positive, or p-channel, MOSFETs) that have more energy than the average charge carrier may stray out of the conductive channel between the source and drain, and become trapped in the insulating dielectric. This process, termed hot-carrier injection (HCI), may eventually build up electric charge within the dielectric layer, and thus increase the voltage needed to operate the transistor. As the threshold voltage increases, the transistor switching delay may become larger.

Another aging mechanism occurs when a voltage is applied to the gate, a phenomenon termed bias temperature instability (BTI). BTI may cause a buildup of charge in the dielectric, among other issues, though, some of this effect spontaneously disappears after that gate voltage is removed. This recovery occurs within a few microseconds, making it difficult to observe when a transistor is stressed and then the resulting effects are measured only after the stress is removed.

Another aging mechanism comes into play when a voltage applied to the gate may create electrically active defects, known as traps, within the dielectric. When traps become too numerous, these charge traps may join and form an outright short circuit between the gate and the current channel. This kind of failure is termed oxide breakdown, or time-dependent dielectric breakdown. Unlike the other aging mechanisms, which cause a gradual decline in performance, the breakdown of the dielectric may lead to a catastrophic failure of the transistor, causing the IC to malfunction.

Additionally, a phenomenon called electromigration may damage the copper or aluminum connections that tie transistors together or link them to the outside world. Electromigration may occur when a surge of current knocks metal atoms loose from the electrical connections, and may cause them to flow with the electrons. This depletes the metal of some atoms upstream, while causing a buildup of metal downstream. The upstream thinning of the metal increases the electrical resistance of the connection, sometimes becoming an open circuit. The downstream deposition may cause the metal to bulge out of its designated track.

Another reliability related issue in ICs is a phenomenon called stress migration. This is used to describe the flow of metal atoms under the influence of mechanical stress.

Additionally, any defect, such as un-modeled phenomenon, random manufacturing defects, and/or the like, may cause a timing degradation of a signal path over time. Some defects may not appear during testing, verification, initial operation, and/or the like, for example, the die/IC/product may pass all the screening procedures at the testing stage. For example, a via that includes a manufacturing defects, such as less that complete metal coverage, will increase its resistance over time and at some point, causes a timing failure of a logic path. For example, random manufacturing defects may appear anywhere on the IC, and incorporate a large variety of types and levels of defects, so designs may not be able to incorporate safety factors to mitigate these defects. On the other hand, aspects of embodiments of the disclosed techniques may be able to predict the failure of each individual IC based on fingerprint sampling at appropriate IC pathways, and mitigate the failure by preemptive replacement, corrective and preventative actions, notifications to users, compensations within the IC to increase time lifetime, and/or the like.

The term "timing margin," or simply "margin," describes the difference between (a) a timing delay exhibited by a certain data path in an IC, and (b) such timing delay that will cause failure because it prevents a data signal transmitted over the data path from finishing its propagation within a single clock cycle. For example, for a 0.5 nanoseconds (ns)-long clock cycle of an IC clocked at 2 GHz, and a timing delay of 0.45 ns exhibited by a certain data path, the margin is 0.05 ns. If the timing delay of that data path increases (for example, due to aging of microelectronic components of that data path) by more than an additional 0.05 ns, any data signal transmitted over that data path will not manage to propagate within a single clock cycle, leading to failure (also known as a "timing violation"). Accordingly, an exemplary IC should be designed, manufactured, and configured with certain frequency and voltage such that its margin (for example, 0.05 ns in the above case) is long enough to permit the IC to operate for its intended lifetime. A longer margin may be needed for ICs intended for lengthier field operations, or for ICs estimated to experience greater stress.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

According to one aspect, there is provided a device for failure risk measurement in a semiconductor Integrated Circuit (IC). The device comprises: a plurality of data-change pulse generators, each data-change pulse generator being configured, when a signal from a respective data path and/or control logic circuit of the semiconductor IC changes, to generate a pulse of a preset time duration on a respective output path, each of the data paths and/or control logic circuits of the semiconductor IC having a common clock; a signal combiner, configured to combine the output paths from the plurality of data-change pulse generators and provide a combined output path thereby; an adjustable delay circuit, configured to delay a signal on the combined output path by a configurable time duration, providing a delayed combined output path signal thereby; and a device state element, configured to receive the delayed combined output path signal at a data input, to be clocked by a signal based on the common clock and to output a failure risk measurement signal.

In embodiments, the signal combiner comprises logic circuitry configured to receive the output paths from the plurality of data-change pulse generators and provide a combined output path using one or more of: a logical OR operation; and a multiplexing operation.

In embodiments, each data-change pulse generator comprises: a signal splitter, coupled to the respective data path and/or control logic circuit of the semiconductor IC and configured to split a signal received from the respective data path and/or control logic circuit of the semiconductor IC between a first test path and a second test path; a delay circuit, configured to delay a signal on the first test path by the preset time duration and provide a delayed first test path signal thereby; and pulse generator logic, configured to receive the delayed first test path signal at a first input and a signal on the second test path at a second input, an output of the pulse generator logic providing the output path of the data-change pulse generator.

In embodiments, each data-change pulse generator further comprises: a device input buffer, configured to receive a signal from the respective data path and/or control logic circuit of the semiconductor IC and provide the received signal to the signal splitter.

In embodiments, the device further comprises: a compensatory delay circuit, configured to receive the common clock and to provide a delayed clock signal to clock the device state element.

In embodiments, the compensatory delay circuit is configured to introduce a delay of a time duration approximately equal to a propagation delay from the data path and/or control logic circuit of the semiconductor IC to the data input of the device state element.

In embodiments, the compensatory delay circuit comprises an OR gate configured to receive the common clock on both first and second inputs.

In embodiments, each data path is defined by a signal path of combinatorial or control logic of the semiconductor IC and/or an input to a respective data path state element that is clocked by the common clock.

In embodiments, the device further comprises: a controller, configured to set the configurable time duration to one of each a group of discrete time duration values for each measurement of the device.

In embodiments, the controller is further configured to change the configurable time duration between measurements of the device, to determine a margin measurement for at least a portion of the semiconductor IC thereby.

In embodiments, the group of discrete time duration values span up to a period of the common clock.

In another aspect, there is provided a semiconductor Integrated Circuit (IC), comprising: logic circuitry, defining a plurality of data paths and/or control logic circuits having a common clock; a device for failure risk measurement, comprising: a plurality of data-change pulse generators, each configured to receive a signal from a respective one of the plurality of data paths and/or control logic circuits and to generate a pulse on a respective output path when the received signal changes; a signal combiner, configured to combine the output paths from the plurality of data-change pulse generators and provide a combined output path thereby; an adjustable delay circuit, configured to delay a signal on the combined output path by a configurable time duration, providing a delayed combined output path signal thereby; and a device state element, configured to receive the delayed combined output path signal at a data input, to be clocked by a signal based on the common clock and to output a failure risk measurement signal.

In embodiments, the logic circuitry comprises a plurality of logic cones or a plurality of combinatorial or control logic circuits, each of the plurality of data paths and/or control logic circuits being associated with a respective one of the plurality of logic cones or the plurality of combinatorial or control logic circuits.

In embodiments, each of the plurality of logic cones comprises a respective cone output state element having a data input and wherein each data path is defined by the data input of an associated cone output state element.

A further aspect provides a method for failure risk measurement in a semiconductor Integrated Circuit (IC), the method comprising: for each of a plurality of data paths and/or control logic circuits of the semiconductor IC, generating a pulse of a preset time duration on a respective output path when a signal from the respective data path and/or control logic circuit of the semiconductor IC changes, the plurality of data paths and/or control logic circuits of the semiconductor IC having a common clock; combining the output paths from the plurality of data-change pulse generators, to provide a combined output path thereby; delaying a signal on the combined output path by a configurable time duration, to provide a delayed combined output path signal thereby; and outputting a failure risk measurement signal from a device state element that is clocked by a signal based on the common clock, the delayed combined output path signal being received at a data input of the device state element.

In embodiments, the failure risk measurement signal is indicative of whether a timing margin of the semiconductor IC is within a certain range of the configurable time duration.

In embodiments, the certain range is at least partly defined by the preset time duration of the pulse.

In embodiments, the steps of generating, combining, delaying and outputting define a measurement process using a specific configurable time duration, the method further comprising: performing the measurement process for a plurality of measurement instances, each of the plurality of measurement instances using a specific configurable time duration; and determining an indication of a timing margin of the semiconductor IC based on the respective failure risk measurement signal of each of the plurality of measurement instances.

In embodiments, the respective specific configurable time duration for each of the plurality of measurement instances is selected from a group of discrete time duration values and/or according to a predetermined sequence.

A yet further aspect may be found in a non-transitory computer readable medium having stored thereon a computer-readable encoding of a device for failure risk measurement in a semiconductor Integrated Circuit (IC), the computer-readable encoding of the loopback testing system comprising encodings of: a plurality of data-change pulse generators, each data-change pulse generator being configured, when a signal from a respective data path and/or control logic circuit of the semiconductor IC changes, to generate a pulse of a preset time duration on a respective output path, each of the data paths and/or control logic circuits of the semiconductor IC having a common clock; a signal combiner, configured to combine the output paths from the plurality of data-change pulse generators and provide a combined output path thereby; an adjustable delay circuit, configured to delay a signal on the combined output path by a configurable time duration, providing a delayed combined output path signal thereby; and a device state element, configured to receive the delayed combined output path signal at a data input, to be clocked by a signal based on the common clock and to output a failure risk measurement signal.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
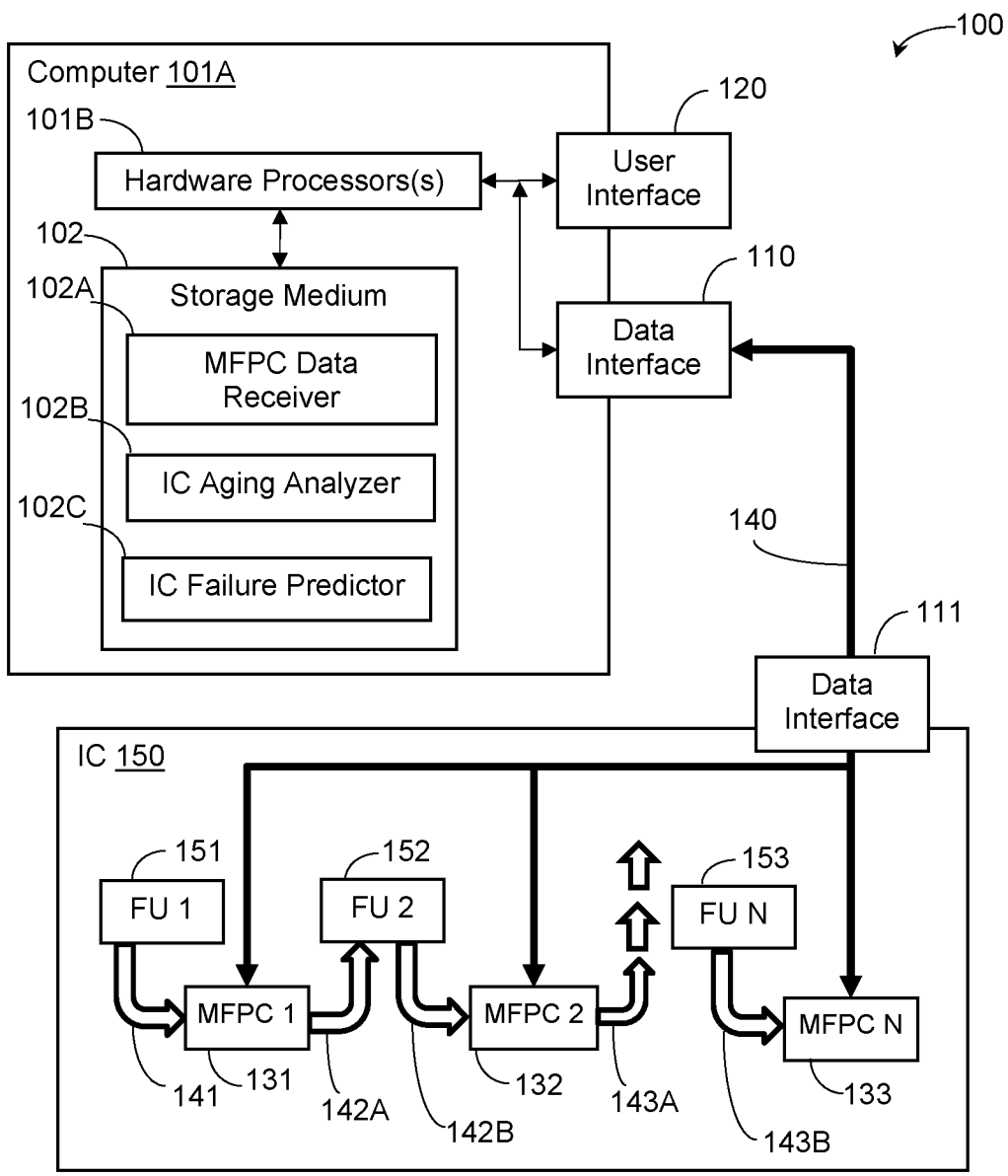
FIG. 1 shows schematically a computerized system for IC margin measurement and failure prediction.

Disclosed herein are methods and devices for determining and predicting a future failure of the individual integrated circuit. Also disclosed is a timing delay margin measurement circuit for an IC (otherwise known as a sensor or agent), from its first operation and/or over time (for example, during any time period from or subsequent to its first operation). A dedicated circuit (which may be detector), such as a failure prediction circuit (FPC) or a margin measurement and failure prediction circuit (MFPC), is placed at selected points along one or more data-paths in a digital integrated circuit (such as one or more FPC or MFPC per data-path), where each dedicated circuit combines multiple individual data paths into a fewer number of test paths. A fingerprint or signature of the delays of each path of the data-path may be acquired during each clock cycle of the functional unit. As used herein, the term "fingerprint" and/or "signature" mean the profile of signal strengths, such as a vector, series, and/or the like, resulting from a measurement of timing delay margins of a combination of signals of a data-path. For each clock cycle of the functional unit, the output data-path may have a different data value. Thus, during each clock cycle, a different combination of the logical paths within the functional unit may be tested, producing a different fingerprint. By collecting a large number of fingerprints over time, a dataset of fingerprints may be analyzed. The analysis of the fingerprint datasets may determine the performance and/or predict future failure of the individual IC.

A margin measurement circuit and method of margin measurement is disclosed in PCT International Publication No. WO2019/097516, entitled "Integrated Circuit Margin Measurement and Failure Prediction Device," which is incorporated herein by reference. The margin measurement circuit described in this document includes the following main components: a signal combiner configured to combine signals from the multiple data paths into a single signal; a signal splitter configured to split the combined signal into two test paths; a delay circuit configured to (gradually) apply varying levels of delay to signals passing through a first one of the two test paths; a comparation circuit configured to determine whether a failure condition is met based on a comparison between the first test path and a second one of the two test paths. Based on multiple comparisons, each with different levels of delay applied, the worst-case remaining margin of the multiple data paths may be determined. The combination of the signal path combiner, signal splitter delay circuit and comparison circuit may provide an FPC or MFPC.

The present disclosure describes an alternative margin measurement circuit and method of margin measurement. Margin measurement may be more generally considered as failure risk measurement and/or prediction.

A margin measurement or failure risk measurement circuit according to the disclosure comprises: a plurality of data-change pulse generators, each data-change pulse generator being configured, when a signal from a respective data path of the semiconductor IC changes, to generate a pulse of a preset time duration on a respective output path, each of the data paths of the semiconductor IC having a common clock; a signal combiner, configured to combine the output paths from the plurality of data-change pulse generators and provide a combined output path thereby; an adjustable delay circuit, configured to delay a signal on the combined output path by a configurable time duration, providing a delayed combined output path signal thereby; and a sensor state element, configured to receive the delayed combined output path signal at a data input, to be clocked by a signal based on the common clock and to output a failure risk measurement signal. The combination of the data-change pulse generators, signal combiner, adjustable delay circuit and sensor state element may provide an FPC or MFPC. A semiconductor IC comprising such a margin measurement or failure risk measurement circuit may further be provided.

A method for margin measurement, failure risk measurement or using a semiconductor IC, for example, may also be considered (in which using may comprise one of more of operating, analyzing and configuring, for instance). For instance, this may include a method for failure risk measurement. The method may comprise: for each of a plurality of data paths of the semiconductor IC, generating a pulse of a preset time duration on a respective output path when a signal from the respective data path of the semiconductor IC changes, the plurality of data paths of the semiconductor IC having a common clock; combining the output paths from the plurality of data-change pulse generators, to provide a combined output path thereby; delaying a signal on the combined output path by a configurable time duration, to provide a delayed combined output path signal thereby; and outputting a failure risk measurement signal from a sensor state element that is clocked by a signal based on the common clock, the delayed combined output path signal being received at a data input of the sensor state element.

It may also be considered that the steps of generating, combining, delaying and outputting may be repeated for each of a plurality of delay times. In this way, a plurality of outputs may be provided. An identifying characteristic (i.e. a signature or fingerprint) for the IC may thereby be determined based on the plurality of outputs. By repeating this process over different clock cycles, multiple such fingerprints may be determined. The fingerprints may then be tracked at different times, for example by tracking changes in the fingerprint over time (using intervals at least as long as the length of time taken to determine a single fingerprint and likely longer).

Further optional method features corresponding with the steps implemented by any of the features described with reference to the IC may also be provided. Examples of these may be discussed below. Specific embodiments will also be discussed below, but further reference will also be made to generalized senses or terms of the disclosure.

Note that a data-path is one example of a design style that can be handled by the FPC or MFPC. Other examples may be memory circuits (the FPC/MFPC is located at the output of the memory), control logic, combinatorial logic and other logic circuits that are grouped together with respect to a certain clock enable (such that they have the same logic clock).

Optionally, aspects of embodiments described herein may be applied to any reliability problem of IC performance, such as aging, latent defects that manifest in the design and cause degradation, manufacturing differences within/between ICs, manufacturing differences between fabs, and/or the like. The techniques described may find changes in timing delays from any source or cause, predict a future failure before the IC failure causes a device/system failure, and enable corrective and preventive action before the specific IC failure. While reliability issues, such as aging, electro-migration, and/or the like, are used here as examples, the techniques may also be applied to latent defects, such as random defects, systematic defects, unknown defects, and/or the like.

Optionally, the delay may be changed in small time steps, producing one or more sweeps of time delays, and associated fingerprints at each different time delay. The sweep may be analyzed to determine the operation of the individual IC, predict a future failure of the IC, and/or the like.

Optionally, one or more datasets (e.g. from signals on the IC) may be analyzed combinatorically to determine the operational delays of each path of the data-path (or equivalent signal path), each logical processing path of the functional unit, and/or the like.

Optionally, one or more datasets may be analyzed statistically to predict a future failure the IC. For example, an IC degradation trend may be analyzed in one or more delay margins measured using the failure prediction circuit, such as be analyzing a minimum delay margin change over time.

Optionally, one or more datasets may be analyzed using machine learning to monitor the failure of the IC, predict a future failure of the IC, and/or the like.

Optionally, one or more datasets may be analyzed to design a future IC.

Optionally, one or more sweeps may be analyzed combinatorically to determine the operational delays of each path of the data-path, each logical processing path of the functional unit, and/or the like.

Optionally, one or more sweeps may be analyzed statistically to predict a future failure the IC. For example, a regression analysis of one or more sweeps determines the changes in timing delays, and an extrapolation to a timing delay failure value determines the time to failure.

Optionally, one or more sweeps may be analyzed using machine learning to monitor the failure of the IC, predict a future failure of the IC, and/or the like.

Optionally, one or more delay time sweeps may be analyzed to design a future IC, where the future IC is designed to avoid the failures of the previous ICs.

Optionally, one or more sweeps are analyzed using machine learning at the beginning-of-life of the chip, e.g. the timing delay margins signature or fingerprint of the IC at the beginning-of-life. The signature or fingerprint may be used for chip outlier detection/screening, i.e. a specific IC is given a unique identity and the signature as compared to other ICs that allows detecting anomalies in a large manufacturing scale. Optionally, Adaptive Voltage Scaling (AVS) may be configured based on the ongoing (during operation) measured timing delay margins.

Reference is now made to FIG. 1, which shows schematically a computerized system 100 for IC failure prediction and margin measurement of logic-paths at the IC testing (tester or system level). System 100 comprises an IC 150, a computer 101A, and a data interface connection 140 connecting the two. IC 150 comprises multiple function or functional units (as at 151, 152, 153, and the like), and data-paths (as at 141, 142A, 142B, 143A, 143B, and the like, which may include synthesized logic) between them. IC 150 comprises margin measurement and failure prediction circuits (MFPCs; as at 131, 132, 133, and the like) for capturing signals from data-paths (as at 142A, 143A, and the like), and determining delay timings of at least some signals form the respective data-path. MFPCs 131, 132, or 133 combine 201 signals from the data-path, and test one or more delays of the combined signals. A clock signal is not shown in FIG. 1, but synchronous logic is typically used with a common clock signal between function units and also clocking the MFPCs. IC 150 comprises a data interface for connecting to data interface connection 140, and sending the delay timings to computer 101A. Delay timing data collected for multiple signals of the data-paths and/or for multiple delay values, such as be changing the delay, may be considered the fingerprint of the delay timings.

Computer 101A comprises one or more hardware processors 101B, a user interface 120 and a non-transitory, computer readable storage medium 102. Storage medium comprises program code, such as an MFPC Data Receiver 102A, an IC Aging Analyzer 102B, an IC Failure Predictor 102C, and/or the like, the program code comprising instructions that when executed on hardware processor(s) 101B, cause hardware processor(s) 101B to receive the signal delay data (i.e. fingerprints) using a data interface 110, such as using MFPC Data Receiver 102A. IC Aging Analyzer 102B analyzes 212 the fingerprints, and IC Failure Predictor 102C notifies 213 an operator of a status, a failure prediction, a preventative action, and or the like, such as using user interface 120.

Optionally, the delay timings are analyzed by a circuit (not shown) of IC 150 to determine when clock and/or logic modifications on IC 150 improve the lifetime of IC 150 before failure. Optionally, the delay timings are analyzed by a circuit (not shown) of IC 150 and a notification is issued of the status or failure prediction.

Optionally, the delay timing fingerprint may be generated at the IC testing (tester or system) to extract the time-zero margin map of the data-paths in a certain unit.

The fingerprint may be analyzed at a time of initial operation and monitored over the life of the IC to determine when a predicted failure may occur. For example, a defect degradation gradient analysis may determine the future time of a failure of the IC. For example, analyzing the minimum margin of a fingerprint, plotting the minimum margin over time, and extrapolating the plot to a margin delay of zero determines the predicted time of failure. Optionally, the delay timing fingerprint may be used to measure the effectivity of the test (for instance, when testing ICs before sending to the field).

Figure 2:
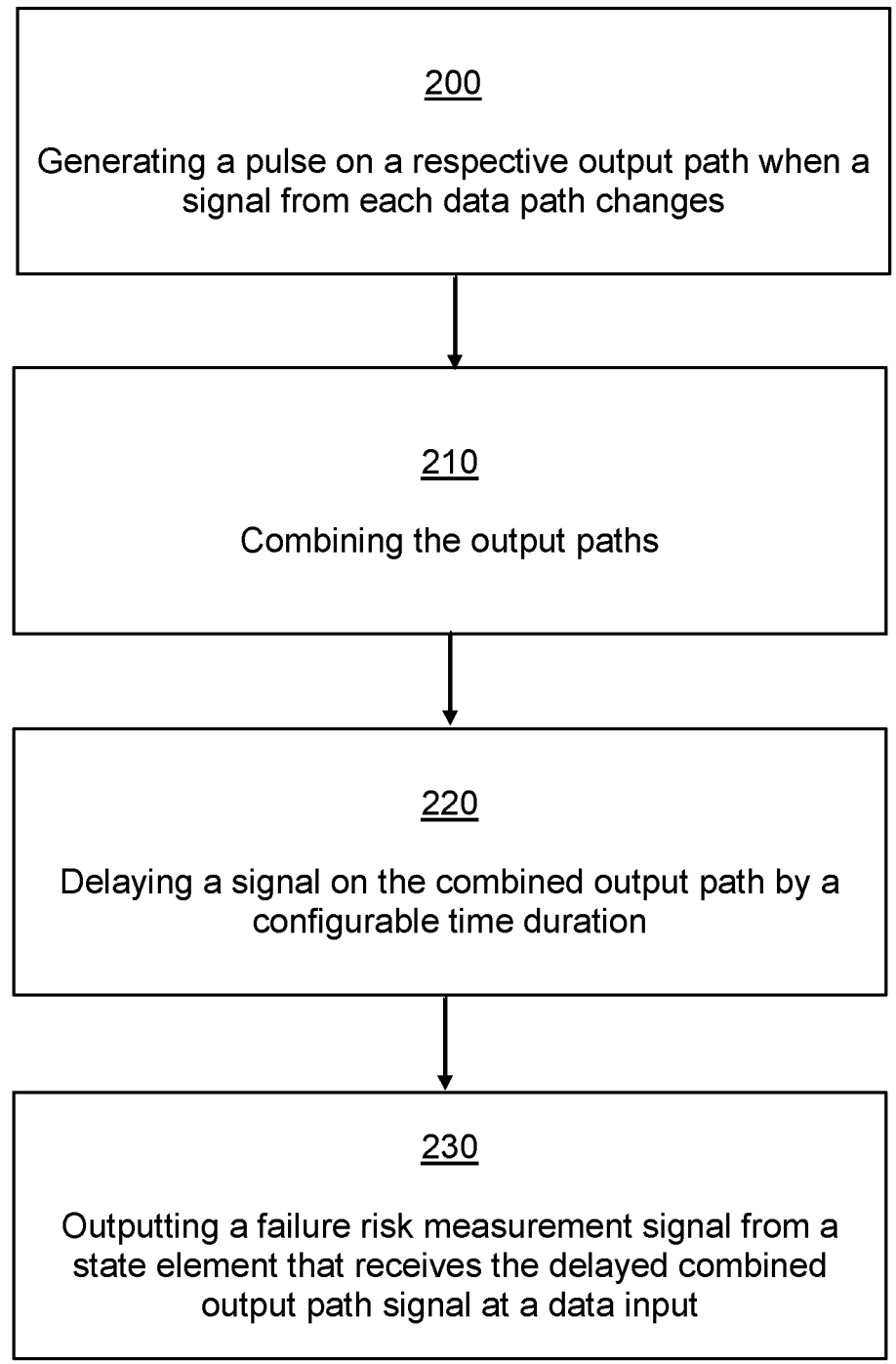
FIG. 2 shows a flowchart of a method for IC margin measurement and failure prediction.

Reference is next made to FIG. 2, which shows a flowchart of a method for IC margin measurement and failure prediction. The method is typically performed at a sensor on the IC, for example local to logic circuitry for which at least one margin is to be measured. As discussed above, the logic circuitry may define at least one and normally, a plurality of logic cones. Each logic cone generally ends in data path that provides a data input to a flip-flop (more generally, state element). The data paths (specifically, the flip-flops at the end of the data paths) share a common clock. More generally, the logic circuitry also uses the common clock (that is, it is synchronous digital logic). The sensor is advantageously for measuring the worst-case margin across a plurality of logic cones; in other words, across a plurality of data paths.

In a first step 200, for each data path being measured (optionally, after its timing has been equalized to match other paths, as will be explained below), a pulse is generated on a respective output path when a signal from the respective data path changes (from a logic [1] to a logic [0] or from a logic [0] to a logic [1]). Each circuit that generates this pulse may be termed a respective data-change pulse generator. This results in a plurality of output paths, each output path being configured to carry a pulse signal when generated.

In a second step 210, the output paths are combined. This is performed by a signal combiner, the implementation of which will be discussed below. The result of this step is a signal on a combined output path. The signal may be a logical '1' when any one of the individual output paths feeding into the combined output path carries a logical '1' signal and a logical '0' when all of the individual output paths feeding into the combined output path carry a logical '0' signal.

In a third step 220, the signal on the combined output path is delayed by a configurable time duration. The configurable time duration of the delay is set according to the margin measurement being tested. This will be discussed further below.

The delayed signal is provided as a data input to a sensor flip-flop (state element). The sensor flip-flop is clocked by a signal that is based on the common clock (this clock signal is effectively the same logic clock as the common clock, in that it is controlled by the same enable signal), although typically with a fixed (compensatory) delay applied, as will be explained below. In a fourth step 230, a failure risk measurement signal is output from the sensor state element. This failure risk measurement signal generally indicates whether a timing violation has occurred when the delay set by the configurable time duration is applied to the combined data path. This may allow a timing margin for the combined data path to be determined. For example, if a timing violation does not occur when a first, shorter delay is applied and does occur when a second, longer delay is applied, a range (upper and lower bound) for the timing margin of the combined data path may be identified. In this respect, the operation of the sensor is similar to those disclosed in PCT International Publication No. WO2019/097516.

Figure 3:
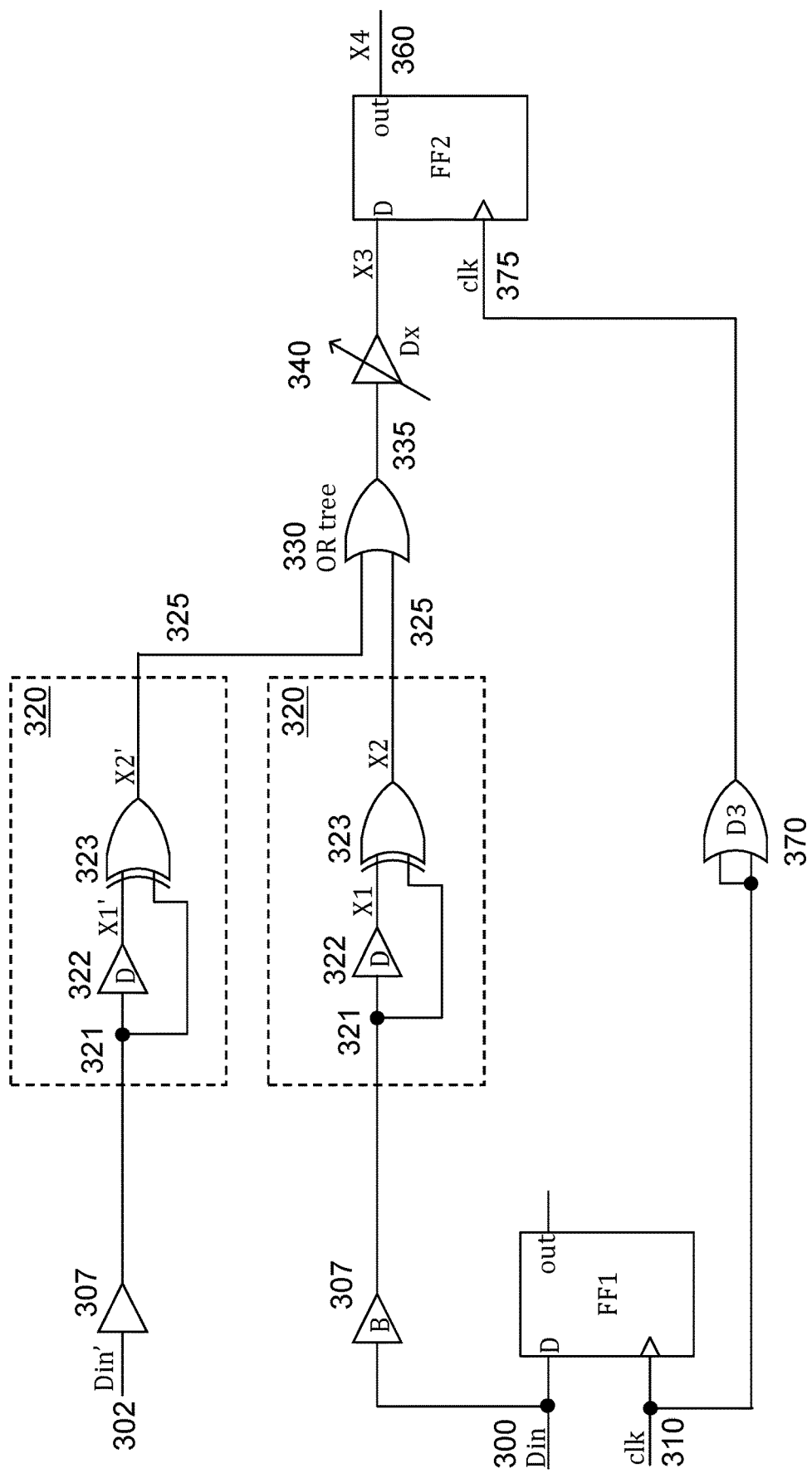
FIG. 3 shows a circuit diagram for an IC margin measurement and failure prediction sensor.

Referring now to FIG. 3, there is shown a circuit diagram for an IC margin measurement and failure prediction sensor. The sensor comprises: a plurality of data-change pulse generators 320, each receiving a signal from a respective data path and providing a respective output path; a signal combiner 330; an adjustable delay circuit 340; and a sensor flip-flop (state element or register) FF2 350.

A first data path Din 300 is at the end of logic circuitry of the IC defining a first logic cone (not shown) and is received at the data input D of a first logic cone flip-flop FF1 305 (a first data path or cone output state element). The first logic cone flip-flop FF1 305 is clocked by the common clock of the logic circuitry clk 310. A second data path Din' 302 is at the end of logic circuitry of the IC defining a second logic cone (not shown) and is received at the data input D of a second logic cone flip-flop (which may be termed a second data path or cone output state element, not shown). The second logic cone flip-flop is likewise clocked by the common clock of the logic circuitry clk 310.

Each of the first data path 300 and second data path 302 is received, via a respective sensor input (data) buffer 307 (B), at a respective data-change pulse generator 320. Each of the sensor input buffers 307 (B) is used to drive the signal from the logic cone endpoint through the data-change pulse generator 320. A delay introduced by each sensor input buffer 307 (B) may be different between data paths. For example, the delay introduced by the sensor input buffer 307 (B) may be set to equalize (or substantially equalize) timing between each of the monitored data paths, such that a different delay per data path may be implemented.

Each data-change pulse generator 320 comprises: a signal splitter 321 (which is typically, defined by a common node having multiple output branches), configured to split the data path into two test paths; a delay circuit (applying delay of the preset time duration D) 322 on a first of the two test paths, generating a delayed signal X1 (or X1' for the data-change pulse generator on the second data path); and an XOR gate 323 having a first input receiving the delayed signal from the delay circuit 322 and a second input receiving the second test path from the signal splitter 321. The XOR gate 323 provides the respective output path 325 of each data-change pulse generator carrying an output path signal X2 (or X2' for the data-change pulse generator on the second data path).

The output path signal X2 will be a logic [1] at any data-change event at the input of first logic cone flip-flop FF1 305 and it will stay at logic [1] for a time equal to the delay D. For example, if the change at the data input Din of the first logic cone flip-flop FF1 305 was at a time t=$t_0$, and the delay caused by XOR gate 323 is XOR-delay, then the output path signal X2 will rise at time t=$t_0$+XOR-delay and the output path signal X2 will fall at time t=$t_0$+XOR-delay+D. Thus, a pulse of preset time duration, width or length (D) is generated.

Each output path 325 is fed to the signal combiner 330. In this embodiment, the signal combiner 330 comprises logic circuitry, specifically an OR gate or OR tree (other options will be discussed below). The signal combiner 330 combines the output paths 325 and provides a combined output path 335 accordingly.

The adjustable delay circuit (delay line) 340 delays a signal on the combined output path 335 according to a configurable time duration Dx, which will be discussed further below. Typically, the configurable time duration Dx can be selected from a predetermined set of discrete options. The adjustable delay circuit 340 provides a delayed combined output signal X3 which is received at a data input D of the sensor flip-flop FF2 350.

The clock input of the sensor flip-flop FF2 350 is derived from the common clock 310. The common clock 310 is delayed by a compensatory delay circuit 370 that provides a preset delay D3. This compensatory delay circuit 370 is intended to maintain the timing of the data input Din of the first logic cone flip-flop FF1 305 at the data input Din of the sensor flip-flop FF2 350, for a minimal value of Dx (which in practice is greater than zero, since it may represent the intrinsic delay of the adjustable delay circuit 340). Hence, a delayed clock 375 provided to the sensor flip-flop FF2 350, is the same as the common clock 310 delayed by D3, which is equal to the same amount of the data (propagation) delay between the first logic cone flip-flop FF1 305 (data path being measured) and the sensor flip-flop FF2 350 (specifically its data input). In principle therefore, the delay value D3 should be equal to the sum of the delays introduced by each of: the sensor input buffer 307 (B); the XOR gate 323; the signal combiner 330 (balance OR tree); and the minimal value of Dx (intrinsic delay of the adjustable delay circuit 340). In this embodiment, the compensatory delay circuit 370 is an OR gate, having both inputs coupled together. A signal X4 at the of the sensor flip-flop FF2 350, defining a sensor output 360, is thus defined by the delayed combined output signal X3 sampled at the data input of the sensor flip-flop FF2 350 at an edge of the delayed clock 375. The output signal X4 defining the sensor output 360 represents a failure risk measurement signal, which can be used for margin and/or failure risk measurement, as discussed further below.

It can be seen that the timing of a data-change-event at the data input Din of the first logic cone flip-flop FF1 305 is relative to the rising edge of the clock and to the propagation delay of a certain logic path sampled by first logic cone flip-flop FF1 305. The worst-case (WC) data-change-event from a timing perspective corresponds with the longest propagation delay. In other words, the path with the longest propagation delay will result in a data-change-event closest relative to the rising edge of the common clock 310.

The sensor circuit of FIG. 1 operates based on the output X2 of each data-change pulse generator 320 being sampled by the sensor flip-flop FF2 350 after being delayed by: the signal combiner (OR tree) 330 and the variable delay Dx introduced by the adjustable delay circuit 340.

The relative timing to the clock at the data input Din of the first logic cone flip-flop FF1 305 and at the data input Din of the sensor flip-flop FF2 350 is identical (all the data-delay was compensated by D3).

The following notation can be used to understand the operation of the sensor better. The clock cycle time (for example, in picoseconds) is given by Tcycle. The propagation delay during clock cycle number i at the data input Din of the first logic cone flip-flop FF1 305 is given by P1($i$). The configurable time duration applied by the adjustable delay circuit 340 during clock cycle number i is given by Dx(i). The sensor flip-flop FF2 350 has a setup time represented by FF2-setup-time and a hold time represented by FF2-hold-time.

Then, the sensor flip-flop FF2 350 will sample a logic [1] at its data input, such that the signal X4 at the output of the sensor flip-flop FF2 350 is a logic [1] at the next clock cycle, if the following two conditions are met:

$$Dx(i) < Tcycle - P1(i) - FF2\text{-setup-time}$$

$$Dx(i) > Tcycle - P1(i) - D + FF2\text{-hold-time}$$

In operation, configurable time duration Dx is implemented as a variable that is changed between clock cycles in a sequence having elements from a set of (discrete) time duration values. For example, a suitable sequence may change the configurable time duration Dx from a maximum to a minimum value sequentially. Advantageously, the values for the configurable time duration Dx may be up to and/or span a period of the common clock clk 310. From the measurement results, a value for Dx is identified that is a lowest value for Dx at which the output signal X4 is a logic [1], Dx(i)_low.

The two conditions given above define an interval for which the sensor flip-flop FF2 350 will sample a logic [1]. The conditions above define lower and upper bounds for the margin at the endpoint defined by the data input Din of the first logic cone flip-flop FF1 305 (which corresponds with Tcycle−P1($i$)):

$$Dx(\text{minimal})+D-FF2\text{-hold}>\text{Margin}>Dx(\text{minimal})+FF2\text{-setup}.$$

The WC margin is the minimum margin obtained over all clock cycles (i=1 to n). In view of the signal path combiner 330, the output signal X4 can be used to determine the minimal (WC) margin of all logic cone endpoints for which data paths are provided to the sensor. The pulse width (D) defines the minimum margin that may be detected. It can thus be used as a parameter to define the device performance.

In a general sense, there may thus be considered a device (for example, a sensor) for failure risk measurement in a semiconductor IC. The device comprises: a plurality of data-change pulse generators, each data-change pulse generator being configured, when a signal from a respective data path and/or control logic circuit of the semiconductor IC changes, to generate a pulse on a respective output path; a signal combiner, configured to combine the output paths from the plurality of data-change pulse generators and provide a combined output path thereby; an adjustable delay circuit, configured to delay a signal on the combined output path by a configurable time duration, providing a delayed combined output path signal thereby; and a device state element (for example, a flip-flop), configured to receive the delayed combined output path signal at a data input, to be clocked by a signal based on the common clock and to output a failure risk measurement signal.

There may also be considered a semiconductor Integrated Circuit (IC), comprising: logic circuitry, defining a plurality of data paths and/or control logic circuits and a device for failure risk measurement as discussed herein.

Any device, circuit or IC may be provided in the form of a computer-readable encoding. This may be provided as a signal or stored on a (non-transitory) computer readable medium.

The logic circuitry may comprise a plurality of logic cones or a plurality of combinatorial or control logic circuits, each of the plurality of data paths and/or control logic circuits being associated with a respective one of the plurality of logic cones or the plurality of combinatorial or control logic circuits. Beneficially, each of the plurality of logic cones comprises a respective cone output state element having a data input. Then, each data path may be defined by the data input of an associated cone output state element.

There may likewise be provided a method for failure risk measurement in a semiconductor IC. The method comprises: for each of a plurality of data paths and/or control logic circuits of the semiconductor IC, generating a pulse on a respective output path when a signal from the respective data path and/or control logic circuit of the semiconductor IC changes; combining the output paths from the plurality of data-change pulse generators, to provide a combined output path thereby; delaying a signal on the combined output path by a configurable time duration, to provide a delayed combined output path signal thereby; and outputting a failure risk measurement signal from a device state element that is clocked by a signal based on the common clock, the delayed combined output path signal being received at a data input of the device state element.

Various features may be common to all aspects of the disclosure. For example, each of the data paths and/or control logic circuits of the semiconductor IC advantageously has a common clock. Beneficially, the pulse generated by the data-change pulse generators is of a preset time duration. Each data path may be defined by a signal path of combinatorial or control logic of the semiconductor IC and/or an input to a respective data path state element that is clocked by the common clock.

The failure risk measurement signal may be indicative of whether a timing margin of the semiconductor IC is within a certain range of the configurable time duration. The certain range may be at least partly defined by the preset time duration of the pulse.

The signal combiner may comprise logic circuitry configured to receive the output paths from the plurality of data-change pulse generators and provide a combined output path using one or more of: a logical OR operation; and a multiplexing operation.

Each data-change pulse generator may comprise: a signal splitter, coupled to the respective data path and/or control logic circuit of the semiconductor IC and configured to split a signal received from the respective data path and/or control logic circuit of the semiconductor IC between a first test path and a second test path; a delay circuit, configured to delay a signal on the first test path by the preset time duration (D) and provide a delayed first test path signal thereby; and pulse generator logic (for example, an XOR gate), configured to receive the delayed first test path signal at a first input and a signal on the second test path at a second input, an output of the pulse generator logic providing the output path of the data-change pulse generator.

Each data-change pulse generator may further comprise: a device input buffer (B), configured to receive a signal from the respective data path and/or control logic circuit of the semiconductor IC and provide the received signal to the signal splitter. This may allow timing equalization.

The device may further comprise: a compensatory delay circuit, configured to receive the common clock and to provide a delayed clock signal to clock the device state element. The compensatory delay circuit may be configured to introduce a delay of a time duration approximately equal to a propagation delay from the data path and/or control logic circuit of the semiconductor IC to the data input of the device state element. Optionally, the compensatory delay circuit comprises one or more components corresponding with those of the pulse generator logic, for example an OR gate, configured to receive the common clock on both first and second inputs.

The device may further comprise: a controller, configured to set the configurable time duration to one of each a group of discrete time duration values for each measurement of the device. Optionally, the controller is further configured to change the configurable time duration between measurements of the device, to determine a margin measurement for at least a portion of the semiconductor IC thereby. The group of discrete time duration values may span (from a minimal amount) up to a period of the common clock.

The steps of generating, combining, delaying and outputting may define a measurement process using a specific configurable time duration. Then, the method may further comprise: performing the measurement process for a plurality of measurement instances, each of the plurality of measurement instances using a specific configurable time duration. An indication of a timing margin of the semiconductor IC may thus be determined based on the respective failure risk measurement signal of each of the plurality of measurement instances. The respective specific configurable time duration for each of the plurality of measurement instances may be selected from a group of discrete time duration values and/or according to a predetermined sequence.

Figure 4:
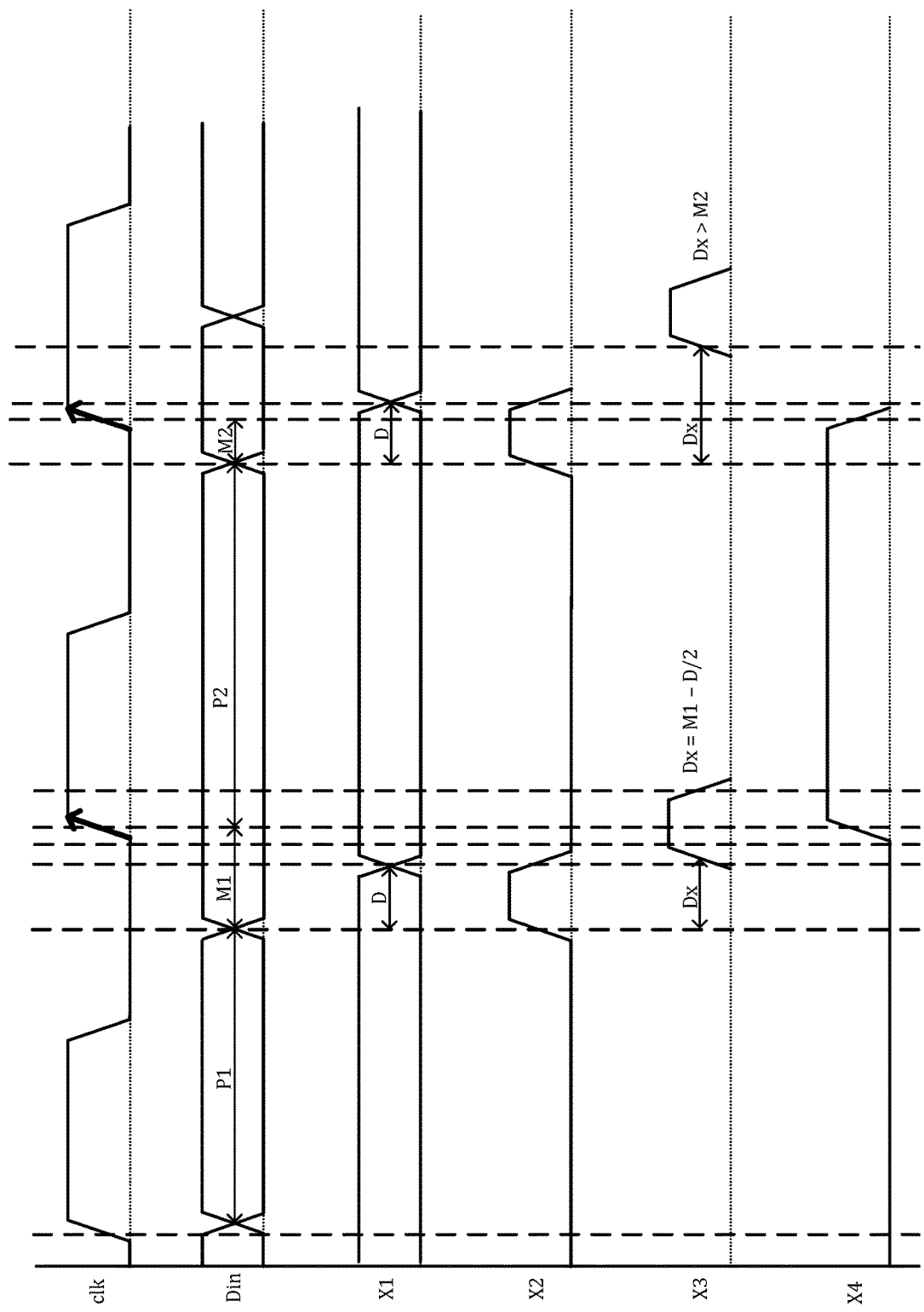
FIG. 4 shows timing diagrams of signals for IC margin measurement and failure prediction based on the circuit diagram of FIG. 3.

Referring to FIG. 4, there are shown timing diagrams of exemplary signals for IC margin measurement and failure prediction based on the circuit diagram of FIG. 3. In this example, only one data path (the data input to the first logic cone flip-flop FF1 305) is provided to the sensor. The common clock clk 310 is shown as the top signal of FIG. 4 and beneath this is shown the data signal at the data input Din of the first logic cone flip-flop FF1 305 (that is, the signal on the first data path, which is the only data path being analyzed). The common clock clk 310 shows a first clock cycle, ending at a first rising edge 400 and a second clock cycle, ending at a second rising edge 410. Marked on the data signal at Din are: a propagation delay P1 for the first clock cycle; a timing margin M1 for the first clock cycle; a propagation delay P2 for the second clock cycle; a timing margin M2 for the second clock cycle.

Also shown are: the delayed signal X1 at the output of the delay circuit 322; the output path signal X2 at the output of the data-change pulse generator 320; the delayed combined output signal X3; and the sensor output 360, corresponding with the signal X4 at the of the sensor flip-flop FF2 350. As can be seen, the delayed signal X1 is identical to the data signal at Din by delayed by D. Thus, the output path signal X2 comprises a pulse of length D generated when the data signal at Din changes.

Since there is only one data path being analyzed, the delayed combined output signal X3 is simply the output path signal X2 delayed by the configurable time duration Dx. In this example, to show the situation when a timing violation is detected, Dx is equal to M1−D/2 (also note that D/2 is greater than both the setup time and hold time of the sensor flip-flop FF2 350). Since M1 is equivalent to Tcycle−P1, the two conditions identified above for the signal X4 at the output of the sensor flip-flop FF2 350 to be a logic [1] during the immediately subsequent clock cycle are met. It is seen that, during the entire duration of the second clock cycle, X4 is a logic [1].

For the second clock cycle, Dx is greater than M2. The two conditions identified above for the signal X4 at the output of the sensor flip-flop FF2 350 to be a logic [1] during the immediately subsequent clock cycle are not met. It is seen that, during a third clock cycle that starts after the second rising edge 410, X4 is a logic [0]. It can thus be seen that by varying Dx between clock cycles, a determination can be made of a range for the WC timing margin of the data path based on the indication of whether a timing violation applies over multiple clock cycles.

If multiple data paths are coupled to the sensor, the output of the signal combiner 330 (in this case, an OR tree) is a logic OR of all the pulses of length D (interval) generated at each of the multiple data-change pulse generators 320. The combined interval may be longer than D, so the margin will be detected by a lower bound of the Dx delay, that is Dx(i)_low. The resolution of the detection is still D in this case.

As discussed above, each sensor (FPC or MFPC) is operated over multiple instances, each with a different delay, in order to determine a margin for the logic circuit (FU). An output of the MFPC indicates whether the margin of the data paths tested is at least that of the delay applied by the adjustable delay-line Dx. Effectively, the delay is incrementally increased from a minimal value (pass condition) in each subsequent clock cycle until a timing violation occurs.

Typically, the delay-line Dx can be adjusted to one of a group of discrete delay values, each delay value corresponding with a specific timing margin value. These typically span a period of the common clock. For example, the adjustable delay-line Dx can be configurable to apply a delay corresponding with that of a defined number of buffers, in each measurement instance. In one such implementation, the adjustable delay-line Dx comprises 32 delay configurations, thereby allowing a delay of between zero buffers and 31 buffers to be set. Each buffer may correspond with a delay of 0.01 ns. Thus, operation of the sensor can be used to indicate that a margin for the FU is between two integer number of buffers (a so-called 'bin' for the timing margin).

For example, the initial delay value (zero buffers) may be 0.01 ns, which is then increased in increments of 0.01 ns with every instance. Each instance typically lasts multiple clock cycles and the number of clock cycles per instance is normally the same. The fourth incremental increase will bring the artificial delay to 0.05 ns, and, assuming that the (yet unknown) margin is indeed 0.05 ns, the data signal will not successfully propagate in the respective instance. This failure to propagate (timing violation) is then detected, and the margin of that data path can be determined to be between 0.04 ns and 0.05 ns.

This sequence of gradually incrementing the artificial delay may be periodically repeated during the lifetime of the IC. Every time the artificial delay causes a timing violation, the sequence may restart from the shortest artificial delay (for example, 0.01 ns).

The techniques disclosed herein may be expanded to other types of logic paths/signals, path lengths, and different types of generating and sampling electronic elements. For example, phase paths, latch-based logic paths, gated-clock logic paths, flip-flop (FF) fall timing logic signals, and/or the like. For example, embodiments may detect hold-failure (min-delay) that is caused by a delay degradation in the clock path.

The MFPC may be always on or activated by an enable signal. For example, an enable signal represents a logical OR of the enable signals corresponding to the group of FFs that are sampled by the MFPC. When the enable is low, the MFPC may enter into an anti-IC aging mode detection, where a dedicated clock is used to toggle the MFPC to mitigate NBTI aging effects.

When the MFPC covers large logic areas (FUs) of the IC, the MFPC may be used as a timing delay margin signature or fingerprint of the IC at first operation. Over time, the MFPC may measure the margin signature at different times to analyze and detect the time gradient of the IC degradation/aging. Different gradient functions may be related to different types of defects and degradation modes.

Optionally, the signature comprises multiple, overlapping delay margins, and a several critical timing delay margins are identified as having different time gradients each, and each is separately analyzed to predict a future IC failure. For example, non-linear, spatiotemporal correlation methods are used to track multiple timing delay margins simultaneously from a series of signatures or fingerprints, each signature or fingerprint representing a one-dimensional vector of all timing delays overlapped. For example, a transformation is performed of multiple one-dimensional vectors to produce a two or more-dimensional data representation. For example, Laube et al. published in 2002, "Analyzing Relative Motion within Groups of Trackable Moving Point Objects", in Lecture Notes in Computer Science (Egenhofer et al.—editors—Geographic Information Science, GIScience 2002), vol. 2478 (Springer, Berlin, Heidelberg), pages 132-144.

When the performance of semiconductor integrated circuits is degraded over time, the progression of physical defects may gradually increase the delay time of the IC's circuits. The IC may fail when the delay time exceeds the IC's clock cycle time. Existing defect detection techniques may be able to detect defects after failure occurs, but when eminent failure is predicted, preemptive maintenance may be performed. This is especially important to applications where cost of failure is high (such as autonomous vehicles), cost of replacement is high (such as satellite IC failure), cost of failure to product image is high (such as a resulting negative user experience is created by failure), and/or the like. An integrated circuit (IC) embodiment using the techniques disclosed herein, includes a failure prediction circuit and a system that may alert of an imminent failure before the failure occurs.

For example, in the generalized sense discussed above, the variable delay time may be set in an integer multiple of increments equal to a clock period of the IC divided by a factor (a "signature vector size"), which may be from 1 to 100,000.

In some embodiments, the failure prediction circuit is comprised of a pair of storage components (e.g., flip-flops) that both receive a data signal output from a large number of paths of the IC, such as a data-path, memory paths, logic paths, and/or the like. To reduce overhead, the data signal is reduced using Hamming codes, parity codes, other error-correction techniques, and/or the like, before being stored in the two storage components. The two storage components differ from each other in data signal input timings, clock signal input timings, phase of input signals, input logic thresholds of the data signal, and/or the like. For example, a variable timing circuit is used to delay the signal to one of the flip-flops.

The FPC or MFPC further includes electronic components that determine (a) coincidence or non-coincidence of the outputs from the two storage components, and (b) how close the delay between non-coinciding outputs is to the clock cycle time of the IC.

In operation, after the coincidence or non-coincidence of the signal outputs is determined (such as using an XOR component), the failure prediction circuit increments the input timing, clock signal input timing, or input logic thresholds of one of the storage components, and the coincidence or non-coincidence of the outputs is determined again. This cycle may be repeated with small increments.

A log is maintained of the relative length of the sensed delay in comparison to the clock cycle time, as well as of the storage components increment used. Analysis, such as trend detection, combinatorial analysis, machine learning, regression analysis, anomaly detection, and/or the like, may be performed on the logged data, to estimate when the ICs degradation may reach a time when the IC fails, such as when the shortest logical path delay exceeds the subsequent clock cycle time.

This measurement and/or estimation may be utilized in a number of ways. An alert may be issued to the user of the system where the IC is implemented, indicating either the margin (how close the delay is to the IC's clock cycle time) or the estimated failure time. Further, the agent may instruct an operational change of the IC, such as clock speed or voltage reduction, which may postpone the failure and prolong the IC's lifespan.

By continuously monitoring logic circuits at the data-path output using a small number of components, resources, such as IC area, power, and/or the like, may be conserved relative to existing techniques.

For example, the input signals are compressed to generate a Hamming code (compressed into the Hamming space). The Hamming-code may be used for higher-order of error detection, correction, and/or prediction process. For example, an XOR-based circuit is used to combine all data-path signals into two unified signal path that implements a modulo-4 logic operation. Other types of compression (source) code may be used additionally or as an alternative.

The technique may be expanded to other types of logic-paths and sampling sequential elements, for example:
Phase paths
Latch-based logic paths
Gated-clock logic paths
Data-path signal fall based logic paths
Memories inputs & outputs The failure prediction circuit may be always on or may be activated by an enable signal that represents a logic-OR of the signals of a data-path. When the enable is low, the failure prediction circuit uses a dedicated clock to toggle the circuit to mitigate aging effects.

Integrated circuits may implement a large number of synchronous and timing sensitive logic circuits. When the delay of the circuit is increased due to physical degradation, then a timing violation occurs, and the violation may affect the functionality of the circuit. The physical degradation may be caused by aging effects, or due to defects that developed during use. The failure prediction circuit tracks the logic delay margin over time, and may predict a failure due to physical delay degradation.

The output of the FPC or MFPC may be used in a mitigation circuit, which may for example comprise at least one circuit from the group consisting of: a notification circuit; a timing delay measurement (or estimation) circuit (for example, for providing a timing delay output); a data transmission circuit; an IC anti-aging compensation circuit; and a failure analysis circuit.

Where the mitigation circuit is a data transmission circuit, it may be electronically connected to a computerized server. Then, the computerized server is advantageously configured to receive multiple instances of the failure risk measurement signal (for example in respect of different times and/or different data sources). The computerized server may thereby perform a failure prediction analysis of the failure risk measurement signals. Optionally, it may send a notification to a mitigation module (such as an IC anti-aging compensation circuit) when the failure prediction analysis predicts failure of the IC within a predefined time. At least some of the failure risk measurement signals may be generated at multiple values of the variable delay time and/or at least some of the failure risk measurement signals may be generated from multiple instances of at least one value from multiple values of the variable delay time. Optionally, the failure prediction analysis comprises at least one of a machine learning analysis, a trend analysis, a multiple object tracking analysis, and a multivariant analysis. Advantageously, the failure prediction analysis comprises receiving failure risk measurement signals and/or failure prediction analysis results from multiple different ICs.

The failure prediction circuit beneficially continuously monitors a large number of logic circuits, such as signals of a data-path on the output of a functional unit of an IC, using small IC area and power.

In some embodiments, a computer algorithm may be used to determine the population of the failure prediction circuits within a unit per a pre-defined coverage. It may use design-data such as memory-circuits and flip-flop-circuits within the unit. The computer algorithm may also be used to automatically locate the FPC or MFPC circuits per the unit clock-gate signals and to automatically set the input-signal-size per FPC or MFPC for optimal performance (maximum instance coverage with minimum number of FPC or MFPC circuits).

In some embodiments, the delays within the failure prediction circuit may be calibrated. This may be done in order to have a very fast correlation path to the design data and to provide accurate margin results at time zero (during test). One calibration methodology may use Pre-Si estimator functions that are based on on-die sensors (agents) in Post-Si to translate the FPC or MFPC circuit measured margin in Pre-Si to the worst-case margin of the monitored endpoints (FFs) margins.

The term "worst-case" is used here to denote the narrowest (lowest) remaining margin among the multiple data paths. Depending on how signals from the data paths are combined, it may be impossible to know the individual remaining margin of each of these data paths. Instead, the output of the margin measurement circuit in some cases may be indicative of the narrowest margin existing among the data paths. This knowledge is typically sufficient, because if even a single critical path fails due to a timing violation, the entire IC may become effectively inoperative.

In general terms, this may be considered to include measuring or estimating a timing delay for the IC (particularly at initial or time-zero operation), based on the failure risk measurement signal provided to the mitigation circuit. The timing delay may be based on a plurality of failure risk measurement signal outputs (which may be in a single failure risk measurement signal or a plurality of failure risk measurement signals), for example determined by repeating the measurement process for each of a plurality of delay times.

In some embodiments, the margin data of a die can be collected and used for die-classification and anomaly-detection processes. This is done by collecting the margin data of a unit within a die and use ML algorithms to build an estimator function that are based on on-die sensors. More details are described in U.S. provisional patent application No. 62/675,986 entitled "INTEGRATED CIRCUIT PROFILING AND ANOMALY DETECTION", filed Apr. 16, 2018, whose contents were effectively published in the framework of U.S. Patent Application Publication No. 2021/0173007 on Jun. 10, 2021.

In some embodiments, the margin data can be analyzed per a specific running application to generate an application-based frequency/power binning.

A range of circuit designs and schematics are described herein. It will be appreciated that these circuit designs can be embodied in an electronic (also 'digital') representation (also 'encoding'). The electronic representation may be stored in a computer readable medium, particularly of a non-transitory nature. A suitable electronic representation may include a representation for Electronic Computer-Aided Design (ECAD) software, also referred to as Electronic Design Automation (EDA) software. In this case, parts of the representation may be stored across multiple electronic documents or files, possibly including one or more libraries of the ECAD software providing details of the components of the circuit. The ECAD representation may provide instructions suitable for manufacture (also 'fabrication') of a circuit as represented in the design. According to the disclosure, there may be provided such an electronic representation. A method of using such an electronic representation of an electronic circuit as part of manufacturing the electronic circuit is further considered.

Throughout this disclosure, various embodiments may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

In the description and claims of the disclosure, each of the words "comprise" "include" and "have", and forms thereof, are not necessarily limited to members in a list with which the words may be associated. In addition, where there are inconsistencies between this application and any document referred to in this application, it is hereby intended that the present application controls.

To clarify the references in this disclosure, it is noted that the use of nouns as common nouns, proper nouns, named nouns, and the/or like is not intended to imply that embodiments of the invention are limited to a single embodiment, and many configurations of the disclosed components can be used to describe some embodiments of the invention, while other configurations may be derived from these embodiments in different configurations.

In the interest of clarity, not all of the routine features of the implementations described herein are shown and described. It should, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Based upon the teachings of this disclosure, it is expected that one of ordinary skill in the art will be readily able to practice the present invention. The descriptions of the various embodiments provided herein are believed to provide ample insight and details of the present invention to enable one of ordinary skill to practice the invention. Moreover, the various features and embodiments of the invention described above are specifically contemplated to be used alone as well as in various combinations.

Conventional and/or contemporary circuit design and layout tools may be used to implement the invention. The specific embodiments described herein, and in particular the various thicknesses and compositions of various layers, are illustrative of exemplary embodiments, and should not be viewed as limiting the invention to such specific implementation choices. Accordingly, plural instances may be provided for components described herein as a single instance.

While circuits and physical structures are generally presumed, it is well recognized that in modern semiconductor design and fabrication, physical structures and circuits may be embodied in computer readable descriptive form suitable for use in subsequent design, test or fabrication stages as well as in resultant fabricated semiconductor integrated circuits. Accordingly, computer readable encodings and representations of same, whether embodied in media or combined with suitable reader facilities to allow fabrication, test, or design refinement of the corresponding circuits and/or structures are also disclosed. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer readable medium includes at least disk, tape, or other magnetic, optical, semiconductor (e.g., flash memory cards, ROM), or electronic medium and a network, wireline, wireless or other communications medium.

The foregoing detailed description has described only a few of the many possible implementations of the present invention. For this reason, this detailed description is intended by way of illustration, and not by way of limitations. Variations and modifications of the embodiments disclosed herein may be made based on the description set forth herein. The scope of the invention is defined by the appended claims.

It will be appreciated that alternatives to the OR tree (shown in FIG. 3) are possible as a form of signal combiner. Some alternatives may include: a multiplexer (Mux), which may allow identification of a margin of a specific end-point in a certain logic cone; multiple OR trees coupled together by one or more multiplexers; an OR tree with one or more multiplexors at its inputs, such that each multiplexer can select between two inputs, the first input being a respective data path and the second being a logic [0]. This latter configuration may combine the use of an OR tree with a multiplexer tree and may also provide an efficient search (binary search) of the worst-case path.

Embodiments of the present invention may be used to fabricate, produce, and/or assemble integrated circuits and/or products based on integrated circuits.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A device for failure risk measurement in a semiconductor Integrated Circuit (IC), the device comprising:
   a plurality of data-change pulse generators, each data-change pulse generator being configured, when a signal from a respective data path and/or control logic circuit of the semiconductor IC changes, to generate a pulse of a preset time duration on a respective output path, wherein the data paths and/or control logic circuits of the semiconductor IC have a common clock;
   a signal combiner, configured to combine the output paths from the plurality of data-change pulse generators and provide a combined output path thereby;
   an adjustable delay circuit, configured to delay a signal on the combined output path by a configurable time duration, providing a delayed combined output path signal thereby; and
   a device state element, configured to receive the delayed combined output path signal at a data input, to be clocked by a signal based on the common clock and to output a failure risk measurement signal.

2. The device of claim 1, wherein the signal combiner comprises logic circuitry configured to receive the output paths from the plurality of data-change pulse generators and provide a combined output path using one or more of: a logical OR operation; and a multiplexing operation.

3. The device of claim 1, wherein each data-change pulse generator comprises:
   a signal splitter, coupled to the respective data path and/or control logic circuit of the semiconductor IC and configured to split a signal received from the respective data path and/or control logic circuit of the semiconductor IC between a first test path and a second test path;
   a delay circuit, configured to delay a signal on the first test path by the preset time duration and provide a delayed first test path signal thereby; and
   pulse generator logic, configured to receive the delayed first test path signal at a first input and a signal on the second test path at a second input, an output of the pulse generator logic providing the output path of the data-change pulse generator.

4. The device of claim 3, wherein each data-change pulse generator further comprises:
   a device input buffer, configured to receive a signal from the respective data path and/or control logic circuit of the semiconductor IC and provide the received signal to the signal splitter.

5. The device of claim 1, further comprising:
   a compensatory delay circuit, configured to receive the common clock and to provide a delayed clock signal to clock the device state element.

6. The device of claim 5, wherein the compensatory delay circuit is configured to introduce a delay of a time duration approximately equal to a propagation delay from the data path and/or control logic circuit of the semiconductor IC to the data input of the device state element.

7. The device of claim 5, wherein the compensatory delay circuit comprises an OR gate configured to receive the common clock on both first and second inputs.

8. The device of claim 1, wherein each data path is defined by a signal path of combinatorial or control logic of the semiconductor IC and/or an input to a respective data path state element that is clocked by the common clock.

9. The device of claim 1, further comprising:
   a controller, configured to set the configurable time duration to one of each a group of discrete time duration values for each measurement of the device.

10. The device of claim 9, wherein the controller is further configured to change the configurable time duration between measurements of the device, to determine a margin measurement for at least a portion of the semiconductor IC thereby.

11. The device of claim 9, wherein the group of discrete time duration values span up to a period of the common clock.

12. A semiconductor Integrated Circuit (IC), comprising:
logic circuitry, defining a plurality of data paths and/or control logic circuits having a common clock;
a device for failure risk measurement, comprising:
   a plurality of data-change pulse generators, each configured to receive a signal from a respective one of the plurality of data paths and/or control logic circuits and to generate a pulse on a respective output path when the received signal changes;
   a signal combiner, configured to combine the output paths from the plurality of data-change pulse generators and provide a combined output path thereby;
   an adjustable delay circuit, configured to delay a signal on the combined output path by a configurable time duration, providing a delayed combined output path signal thereby; and
   a device state element, configured to receive the delayed combined output path signal at a data input, to be clocked by a signal based on the common clock and to output a failure risk measurement signal.

13. The semiconductor IC of claim 12, wherein the logic circuitry comprises a plurality of logic cones or a plurality of combinatorial or control logic circuits, each of the plurality of data paths and/or control logic circuits being associated with a respective one of the plurality of logic cones or the plurality of combinatorial or control logic circuits.

14. The semiconductor IC of claim 13, wherein each of the plurality of logic cones comprises a respective cone output state element having a data input and wherein each data path is defined by the data input of an associated cone output state element.

15. A method for failure risk measurement in a semiconductor Integrated Circuit (IC), the method comprising:
for each of a plurality of data paths and/or control logic circuits of the semiconductor IC, generating a pulse of a preset time duration on a respective output path when a signal from the respective data path and/or control logic circuit of the semiconductor IC changes, the plurality of data paths and/or control logic circuits of the semiconductor IC having a common clock;
combining the output paths from the plurality of data-change pulse generators, to provide a combined output path thereby;
delaying a signal on the combined output path by a configurable time duration, to provide a delayed combined output path signal thereby; and
outputting a failure risk measurement signal from a device state element that is clocked by a signal based on the common clock, the delayed combined output path signal being received at a data input of the device state element.

16. The method of claim 15, wherein the failure risk measurement signal is indicative of whether a timing margin of the semiconductor IC is within a certain range of the configurable time duration.

17. The method of claim 16, wherein the certain range is at least partly defined by the preset time duration of the pulse.

18. The method of claim 15, wherein the steps of generating, combining, delaying and outputting define a measurement process using a specific configurable time duration, the method further comprising:
performing the measurement process for a plurality of measurement instances, each of the plurality of measurement instances using a specific configurable time duration; and
determining an indication of a timing margin of the semiconductor IC based on the respective failure risk measurement signal of each of the plurality of measurement instances.

19. The method of claim 18, wherein the respective specific configurable time duration for each of the plurality of measurement instances is selected from a group of discrete time duration values and/or according to a predetermined sequence.

20. A non-transitory computer readable medium having stored thereon a computer-readable encoding of a device for failure risk measurement in a semiconductor Integrated Circuit (IC), the computer-readable encoding of the loop-back testing system comprising encodings of:
a plurality of data-change pulse generators, each data-change pulse generator being configured, when a signal from a respective data path and/or control logic circuit of the semiconductor IC changes, to generate a pulse of a preset time duration on a respective output path, each of the data paths and/or control logic circuits of the semiconductor IC having a common clock;
a signal combiner, configured to combine the output paths from the plurality of data-change pulse generators and provide a combined output path thereby;
an adjustable delay circuit, configured to delay a signal on the combined output path by a configurable time duration, providing a delayed combined output path signal thereby; and
a device state element, configured to receive the delayed combined output path signal at a data input, to be clocked by a signal based on the common clock and to output a failure risk measurement signal.

* * * * *